US009802753B2

(12) United States Patent
Kibler

(10) Patent No.: US 9,802,753 B2
(45) Date of Patent: Oct. 31, 2017

(54) PNEUMATIC TANK HAVING FORWARD AND REARWARD TANGENTIAL JOINT LINES

(71) Applicant: MAC TRAILER MANUFACTURING, INC., Alliance, OH (US)

(72) Inventor: Scott A. Kibler, Kensington, OH (US)

(73) Assignee: MAC TRAILER MANUFACTURING, INC., Alliance, OH (US)

(*) Notice: Subject to any disclaimer, the term of this patent is extended or adjusted under 35 U.S.C. 154(b) by 83 days.

(21) Appl. No.: 15/056,237

(22) Filed: Feb. 29, 2016

(65) Prior Publication Data
US 2017/0247182 A1 Aug. 31, 2017

(51) Int. Cl.
*B65D 88/28* (2006.01)
*B60P 3/22* (2006.01)

(52) U.S. Cl.
CPC .............. *B65D 88/28* (2013.01); *B60P 3/224* (2013.01)

(58) Field of Classification Search
CPC ......... B65D 88/28; B65D 88/26; B60P 3/224; B60P 3/2245
See application file for complete search history.

(56) References Cited

U.S. PATENT DOCUMENTS

| 3,858,772 | A * | 1/1975 | Myers, Jr. | ........... B28B 13/0215 222/460 |
| 6,457,630 | B1 * | 10/2002 | Nilsson | .................. B23K 31/02 228/135 |
| 8,668,430 | B2 * | 3/2014 | Oren | ...................... B65G 65/42 414/414 |
| 8,967,673 | B2 * | 3/2015 | Morgan | .................. B60P 3/224 280/837 |
| 9,428,330 | B2 * | 8/2016 | Lopez | .................. B65D 88/027 |
| 9,616,799 | B1 * | 4/2017 | Smith | ..................... B60P 3/243 |
| 2002/0139814 | A1 * | 10/2002 | Bird | ........................ B65D 88/66 222/1 |
| 2009/0032555 | A1 * | 2/2009 | Peterson | ................ B65D 88/26 222/226 |
| 2013/0266411 | A1 * | 10/2013 | Morgan | .................. B60P 3/224 414/462 |
| 2015/0007436 | A1 * | 1/2015 | Kibler | .................. B60P 3/2205 29/897.2 |
| 2015/0130175 | A1 * | 5/2015 | Kibler | .................. B60P 3/2205 280/837 |
| 2015/0137501 | A1 * | 5/2015 | Kibler | ..................... B60P 3/221 280/837 |
| 2015/0360856 | A1 * | 12/2015 | Oren | ..................... B65G 69/181 414/411 |

* cited by examiner

Primary Examiner — Kevin Hurley
Assistant Examiner — Michael R Stabley
(74) Attorney, Agent, or Firm — Sand & Sebolt

(57) ABSTRACT

A tank trailer may include a hopper, an end housing forward or rearward of the hopper, and a slide plate inside the end housing. The slide plate may be configured to help prevent breakage along welds which secure the slide plate.

20 Claims, 22 Drawing Sheets

PNEUMATIC TANK HAVING FORWARD AND REARWARD TANGENTIAL JOINT LINES

BACKGROUND

1. Technical Field

The technical field is related generally to bulk tankers and bulk tank trailers. More particularly, the technical field is related to such a tanker or trailer and the configuration of structure associated with one or more of its slide plates along which particulate cargo material may slide.

2. Background Information

Bulk tankers and bulk tank trailers or pneumatic tank trailers are amongst the many types of vehicles used for hauling materials over highways and the like. They typically have several hoppers or cones which facilitate the discharge of the bulk material from within the tank into a discharge line through which air is pumped to discharge the material to a rear end of the trailer. Valve assemblies are typically located at the bottom of the hoppers whereby the hoppers may be opened or closed to respectively allow the flow of the bulk particulate material from the hoppers into the discharge pipe and to cut off this flow. Forward and rearward slide plates may be used to facilitate the sliding of particulate material downward within the hoppers. Welds along such slide plates are often broken because of the design of the slide plates. Such breakage is especially common in bulk tankers due to the internal pressurization of the tank. There is thus a need in the art to overcome this problem.

SUMMARY

In one aspect, a tank trailer may comprise a hopper having a hopper sidewall defining a bottom exit opening; an end housing which extends forward or rearward of the hopper sidewall and has an end housing inner surface; a slide plate which extends upwardly from adjacent the hopper sidewall inside the end housing and has a slide plate outer surface and an outer perimeter edge comprising a left side edge segment and a right side edge segment; a first weld along one of the side edge segments which secures the slide plate to the end housing inner surface; a first side section of the slide plate which is adjacent the one of the side edge segments; wherein the slide plate outer surface along the first side section comprises a first side section surface adjacent the first weld; the end housing inner surface comprises a first end housing inner surface angle defining portion adjacent the first weld; the first side section surface is adjacent and faces the first end housing inner surface angle defining portion; and as viewed in a viewing direction which is one of (a) a downward and rearward direction and (b) a downward and forward direction, the first side section surface and the first end housing inner surface angle defining portion have respective tangents which define therebetween a first angle which is no greater than 45 degrees.

In another aspect, a tank trailer may comprise a hopper having a hopper sidewall defining a bottom exit opening; an end housing which extends forward or rearward of the hopper sidewall and has an end housing inner surface; a slide plate which extends upwardly from adjacent the hopper sidewall inside the end housing and has a slide plate outer surface and an outer perimeter edge comprising a left side edge segment and a right side edge segment; a first weld along one of the side edge segments which secures the slide plate to the end housing inner surface; a first side section of the slide plate which is adjacent the one of the side edge segments; wherein the slide plate outer surface along the first side section comprises a first side section surface adjacent the first weld; the end housing inner surface comprises a first end housing inner surface angle defining portion adjacent the first weld; the first side section surface is adjacent and faces the first end housing inner surface angle defining portion; and as viewed in a vertically downward viewing direction of a horizontal section of the end housing and slide plate, the first side section surface and the first end housing inner surface angle defining portion have respective tangents which define therebetween an angle which is no greater than 45 degrees.

BRIEF DESCRIPTION OF THE SEVERAL VIEWS OF THE DRAWINGS

One or more sample embodiments is set forth in the following description, shown in the drawings and particularly and distinctly pointed out and set forth in the appended claims.

FIG. 3 may also represent a right side elevation view of a rear portion of the trailer with the understanding that such components as the hitch member and landing gear would not be part of the rear portion of the trailer.

FIG. 5 may represent a sectional view taken on a transverse or axial vertical plane through the front end housing looking rearward (the left line 5-5 of FIG. 1). FIG. 5 may also represent a sectional view taken on a transverse or axial vertical plane through the rear end housing looking forward (the right line 5-5 of FIG. 1).

FIG. 6 may represent a sectional view taken on a transverse or axial vertical plane through the front end housing looking forward (the left line 6-6 of FIG. 1). FIG. 6 may also represent a sectional view taken on a transverse or axial vertical plane through the rear end housing looking rearward (the right line 6-6 of FIG. 1).

FIG. 7 may represent a sectional view taken on a transverse or axial vertical plane through the front end housing looking rearward (the left line 7-7 of FIG. 1). FIG. 7 may also represent a sectional view taken on a transverse or axial vertical plane through the rear end housing looking forward (the right line 7-7 of FIG. 1).

FIG. 13 may represent a sectional view taken on a transverse or axial vertical plane through the front hopper and central section/top wall adjacent the front end of the top wall and adjacent the rear end of the front end housing looking forward (the left line 13-13 of FIG. 1). FIG. 13 may also represent a sectional view taken on a transverse or axial vertical plane through the rear hopper and central section/top wall adjacent the rear end of the top wall and adjacent the front end of the rear end housing looking rearward (the right line 13-13 of FIG. 1).

Similar numbers refer to similar parts throughout the drawings.

DESCRIPTION

Figure 1:
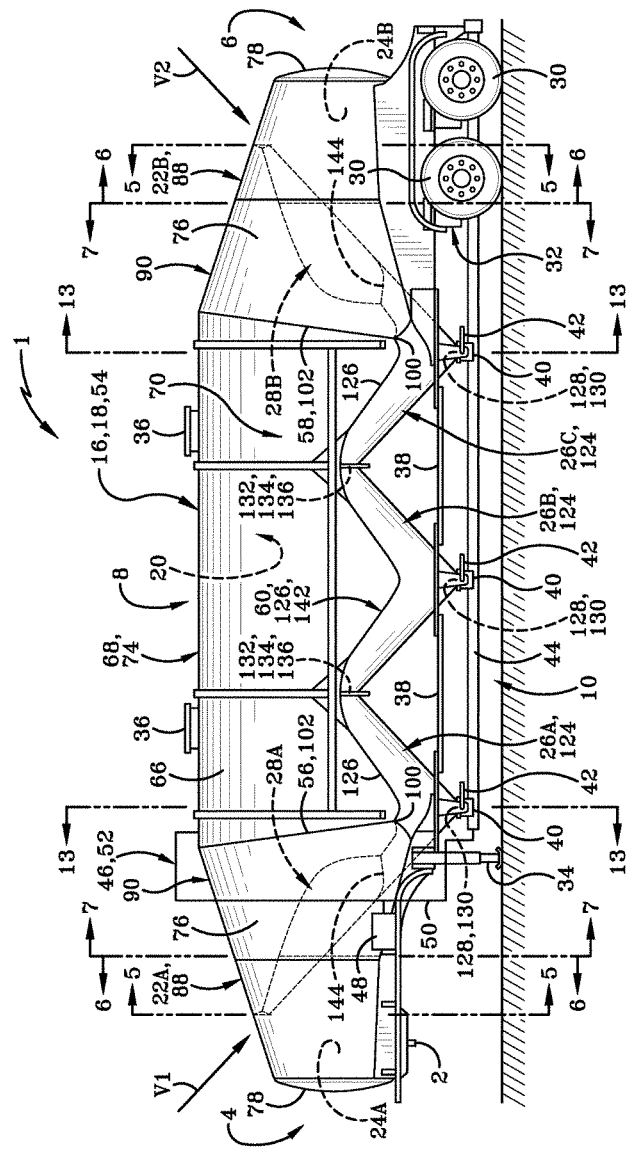
FIG. 1 is a left side elevation view of a pneumatic tank trailer showing a piping assembly and air pump diagramatically.

A bulk tank trailer or pneumatic tank trailer is shown generally at 1 in FIG. 1. Trailer 1 may be a towed vehicle which is towed by a towing vehicle such as an on-road tractor (not shown) whereby trailer 1 and the tractor may form a tractor trailer rig in the form of a bulk tanker. The front of trailer 1 may be pivotally hitched to the rear of tractor via a hitch such as a fifth wheel hitch or the like comprising a hitch member 2 of the trailer. Trailer 1 has a front 4 and a back 6 defining therebetween a longitudinal direction. Trailer 1 further has a top 8, a bottom 10 and left and right sides 12 and 14 (FIG. 2) defining therebetween an axial direction. For clarity, an explanation of some terms used herein is provided. Trailer 1 may have an axial center line CL (FIGS. 5, 6) or center plane which may be a vertical longitudinally extending plane cutting through the center of the trailer midway between the left and right sides thereof. As is readily evident from the Figures, various components are axially offset or spaced from the center plane. The description of trailer 1 may make reference to certain components, sides, surfaces, points and the like as being inboard or outboard of one another, or this may be readily apparent from the Figures even without specific description. Such terms typically relate to the left or right halves of the trailer whereby, for instance, with regard to the left half (left of central plane CL), a first point which is outboard of a second point is further to the left than the second point or further outboard than the second point in a first or left outboard direction, and thus the second point is inboard of or to the right of the first point. Thus, within the left half, the first point is further outboard or further from the center plane than is the second point. Likewise, with regard to the right half (right of central plane CL), a third point which is outboard of a fourth point is further to the right than the fourth point or further outboard than the fourth point in a second or right outboard direction, and thus the fourth point is inboard of or to the left of the third point. Thus, within the right half, the third point is further outboard or further from the center plane than is the fourth point.

Various surfaces may be said to face axially inward or axially outward, which may respectively mean facing generally toward or away from center line/plane CL. Thus, on the left half of trailer 1, a surface which faces axially inward may be said to face generally to the right or rightward, and a surface which faces axially outward may be said to face generally to the left or leftward. On the right half of trailer 1, a surface which faces axially inward may be said to face generally to the left or leftward, and a surface which faces axially outward may be said to face generally to the right or rightward.

Similarly, various components, surfaces etc. may be said to extend axially inward or axially outward, which may respectively mean extending generally toward or away from center line/plane CL. Thus, on the left half of trailer 1, a component etc. which extends axially inward may be said to extend generally to the right or rightward, and a component, etc. which extends axially outward may be said to extend generally to the left or leftward. On the right half of trailer 1, a component, etc. which extends axially inward may be said to extend generally to the left or leftward, and a component etc. which extends axially outward may be said to extend generally to the right or rightward.

Further explanation is provided with respect to references to the longitudinal direction of trailer 1. Certain components of trailer 1 are further forward or rearward of other components, or may be at the same location along the longitudinal axis. Thus, for example, a reference to two points, surfaces, components or the like being "at the same longitudinal position" or "at the same longitudinal location" means that the two points, surfaces, components or the like are at the same position along the longitudinal axis while they may be at different axial positions, that is, spaced to the left or right of one another, or spaced upwardly or downwardly of one another. Similarly, a reference to two points, surfaces, components or the like being "longitudinally adjacent" one another means that the two points, surfaces, components or the like are at or adjacent the same position along the longitudinal axis while they may be at different axial positions or spaced upwardly or downwardly of one another. It is also noted that the term U-shaped or U-shaped configuration may be used herein to mean an upright U-shape or U-shaped configuration and the term inverted U-shaped configuration may be used herein to mean an upside down U-shaped configuration.

With primary reference to FIG. 1, trailer 1 may have a rigid trailer frame or structure or bulk tank assembly 16 which may include a bulk tank 18 defining an interior bulk storage chamber 20; a front end housing 22A defining a front end housing interior chamber 24A; a rear end housing 22B defining a rear end housing interior chamber 24B; several hoppers or cones 26, for example, three hoppers 26A-C; and front and rear slide plate assemblies 28A and 28B. Assembly 16 including tank 18, end housings 22, hoppers 26 and slide plate assemblies 28 may be formed primarily of a metal, for instance, an aluminum alloy or other suitable metal.

Left and right sets of ground engaging wheels 30 may be rotatably mounted on frame/assembly 16 about respective horizontal axially extending axes via a suitable suspension assembly 32 which may be secured to rear end housing 22B and extend downward therefrom adjacent back or back end 6. Trailer 1 may include landing gear 34 generally adjacent front or front end 4. Landing gear 34 may be any suitable type known in the art and be configured to move between a lowered position in contact with the ground for supporting the front of trailer 1 when disconnected from the tractor or other towing vehicle and a raised position out of contact with the ground when trailer 1 is hitched to the tractor/towing vehicle for over the road travel.

Bulk storage chamber 20 may be configured for carrying therein dry particulate material bulk. Such material may be, for example, sand, plastic beads or pellets, or any other solid particulate material typically carried in bulk tank trailers, which may include food grade material. Interior chambers 24A and 24B may be separate from and respectively directly in front of and directly behind interior chamber 20. Hopper 26A may be the frontmost hopper and hopper 26C may be the rearmost hopper with hopper 26B directly therebetween. Hopper 26B may be directly behind hopper 26A, while hopper 26C may be directly behind hoppers 26A and B. Trailer 1 may also be configured with two or four hoppers, and possibly more. Center plane CL may cut through the axial center of each of hoppers 26 midway between the left and right sides thereof. A plurality of hopper feed ports 36 including openable and closable lids may be mounted on top of tank 18 above hoppers 26. Ports 36 may be opened in order to receive the bulk particulate material therethrough to fill chamber 20 to a desired level. The lids of the ports may be closed to secure the particulate material therein and keep moisture and other material out of interior chamber 20 and to provide a generally airtight seal. A tension bar 38 may extend between and be secured to hoppers 26A and 26B adjacent lower ends thereof. Similarly, another tension bar 38 may extend between and be secured to hoppers 26B and 26C adjacent lower ends thereof.

A valve assembly 40 may be secured to the bottom of each hopper 26 and may include a valve which is operated by a control handle 42 so that the handle and valve may be rotatably movable between an open position and a closed position for respectively opening communication between and closing communication between interior chamber 20 and a discharge pipe 44 of an air piping assembly 46, which may be connected to an air/pneumatic pump or compressor 48 which may be mounted on the towing vehicle or tractor or elsewhere. Pump 48 is shown here on or adjacent trailer 1 and may be upstream of piping assembly 46 and interior chamber 20. Pump 48 and air piping assembly 46 may be used to facilitate the discharge of the particulate material from within interior chamber 20 through a rear end of discharge pipe 44 adjacent the rear end 6 of trailer 1. Piping assembly 46 is shown diagrammatically in part for simplicity and given that such piping is known in the art. In addition to discharge pipe 44, air piping assembly 46 may include several air pipes including an air inlet pipe 50 and a blow down pipe 52, such that the various pipes may be in fluid communication with one another and pump 48 when assembly 46 is connected to pump 48. Assembly 46 typically includes several valves (not shown) which are used to control the flow of air through the various pipes of assembly 46. Air inlet pipe 50 may have a front inlet end configured to receive air there through to be pumped from pump 48 through the remainder of assembly 46, including an exit end of pipe 50 which may be connected to an inlet of discharge pipe 44 so that air may also be pumped from the front to the back of pipe 44. Blow down pipe 52 may have an exit end connected to tank 18 adjacent the top thereof whereby blow down pipe 52 is in direct fluid communication with chamber 20. Pump 48 may thus also pump air downstream through pipe 52 into chamber 20 to facilitate pneumatically forcing particulate material in chamber 20 out of bottom exit openings of hoppers 26 through valves 40 when open into discharge pipe 44.

Figure 13:
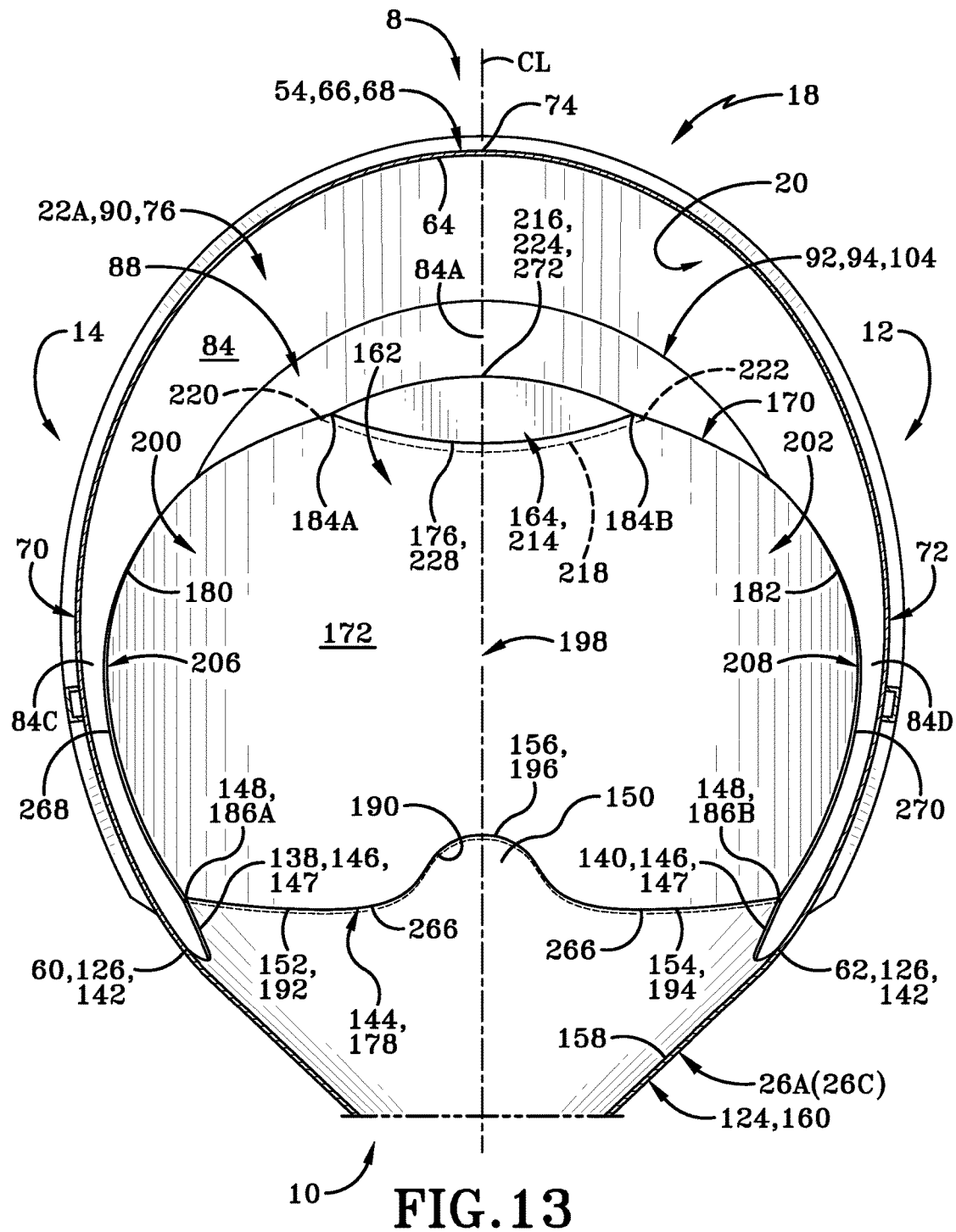
FIG. 13 is an enlarged sectional view taken on each of lines 13-13 of FIG. 1.

With primary reference to FIGS. 1-4 and 13, storage tank 18 is now described. Storage tank 18 may have a central section which may include hoppers 26 and a top wall 54 which may have a generally inverted U-shaped configuration or cross section (FIG. 13). Top wall 54 may be formed of an aluminum alloy or other suitable metal. Top wall 54 may have a front edge 56, a back edge 58, a left side bottom edge 60, a right side bottom edge 62 (FIGS. 4 and 13), an inner surface 64 which faces and partially defines interior chamber 20 and an outer surface 66 which faces away from chamber 20 and serves as part of the outer surface of tank 18. Top wall 54 may have a top section 68, a left section 70 rigidly secured to and extending downwardly from the left side of top section 68, and a right section 72 rigidly secured to and extending downwardly from the right side of top section 68 such that left and right sections 70 and 72 respectively define left and right side bottom edges 60 and 62. Top wall 54 may have a longitudinally elongated peak 74 defined by top section 68 adjacent top 8 of trailer 1. Peak 74 may be essentially or generally horizontal as viewed from the side of the trailer from adjacent front edge 56 to adjacent back edge 58. Peak 74 may be defined by the intersection of outer surface 66 and center plane CL. Front edge 56 may have an inverted U-shaped configuration as viewed from the front, analogous to the cross section of wall 54 in FIG. 13. Similarly, back edge 58 may have an inverted U-shaped configuration as viewed from the back, also analogous to the cross section of wall 54 in FIG. 13. Each of front and back edges 56 and 58 may be straight as viewed from the side and may lie entirely along a respective upwardly extending plane which may extend axially across trailer 1. Left side bottom edge 60 at a front end thereof may intersect the bottom left end of front edge 56 and extend rearwardly therefrom to a rear end of bottom edge 60, which may intersect the bottom left end of back edge 58. Similarly, right side bottom edge 62 at a front end thereof may intersect the bottom right end of front edge 56 and extend rearwardly therefrom to a rear end of bottom edge 62, which may intersect the right bottom end of rear edge 58. Each of side edges 60 and 62 may extend up and down in a serpentine manner from front to rear as viewed from the side. Outer surface 66 may be convexly curved in a continuous fashion as viewed from the front or rear from bottom edge 60 to bottom edge 62. Similarly, inner surface 64 may be concavely curved in a continuous fashion as viewed from the front or rear from bottom edge 60 to bottom edge 62.

Each end housing 22A and 22B may have an end housing sidewall 76 and a cap wall 78 which may be rigidly secured to sidewall 76. Each of sidewall 76 and cap wall 78 may be formed of an aluminum alloy or other suitable metal. It is noted here that tank 18 and various components including the end housings 22, hoppers 26 and slide plate assemblies 28 may be bilaterally symmetrical about a vertical axially extending plane P (FIG. 2) which may be perpendicular to plane CL and may cut through a longitudinal center of tank 18 midway between the front and rear ends thereof, which may be represented by the front and rear ends of end housings 22A and 22B/cap walls 78 thereof. Thus, end housing 22A may be essentially a mirror image of end housing 22B, hopper 26A may be essentially a mirror image of hopper 26C, slide plate assembly 28A may be essentially a mirror image of slide plate assembly 28B, the front half of hopper 26B may be essentially a mirror image of the back half of hopper 26B and the front half of tank 18 may be essentially a mirror image of the back half of tank 18. It is also noted that tank 18 and various components including the end housings 22, hoppers 26 and slide plate assemblies 28 may be bilaterally symmetrical about central plane CL. Thus, the left half of a given end housing 22 may be essentially a mirror image of the right half of the given end housing 22, the left half or a given hopper 26 may be essentially a mirror image of the right half of the given hopper 26, the left half of a given slide plate assembly 28 may be essentially a mirror image of the right half of the given slide plate assembly 28, and the left half of tank 18 may be essentially a mirror image of the right half of tank 18. The description of components forward of plane P may thus be similar to that of components rearward of plane P although various aspects may be in reverse, as will be pointed out further below. Thus, in general, the components which are forward of plane P will be described first and the components which are rearward of plane P will be described further below in order to clarify the distinctions.

Figure 3:
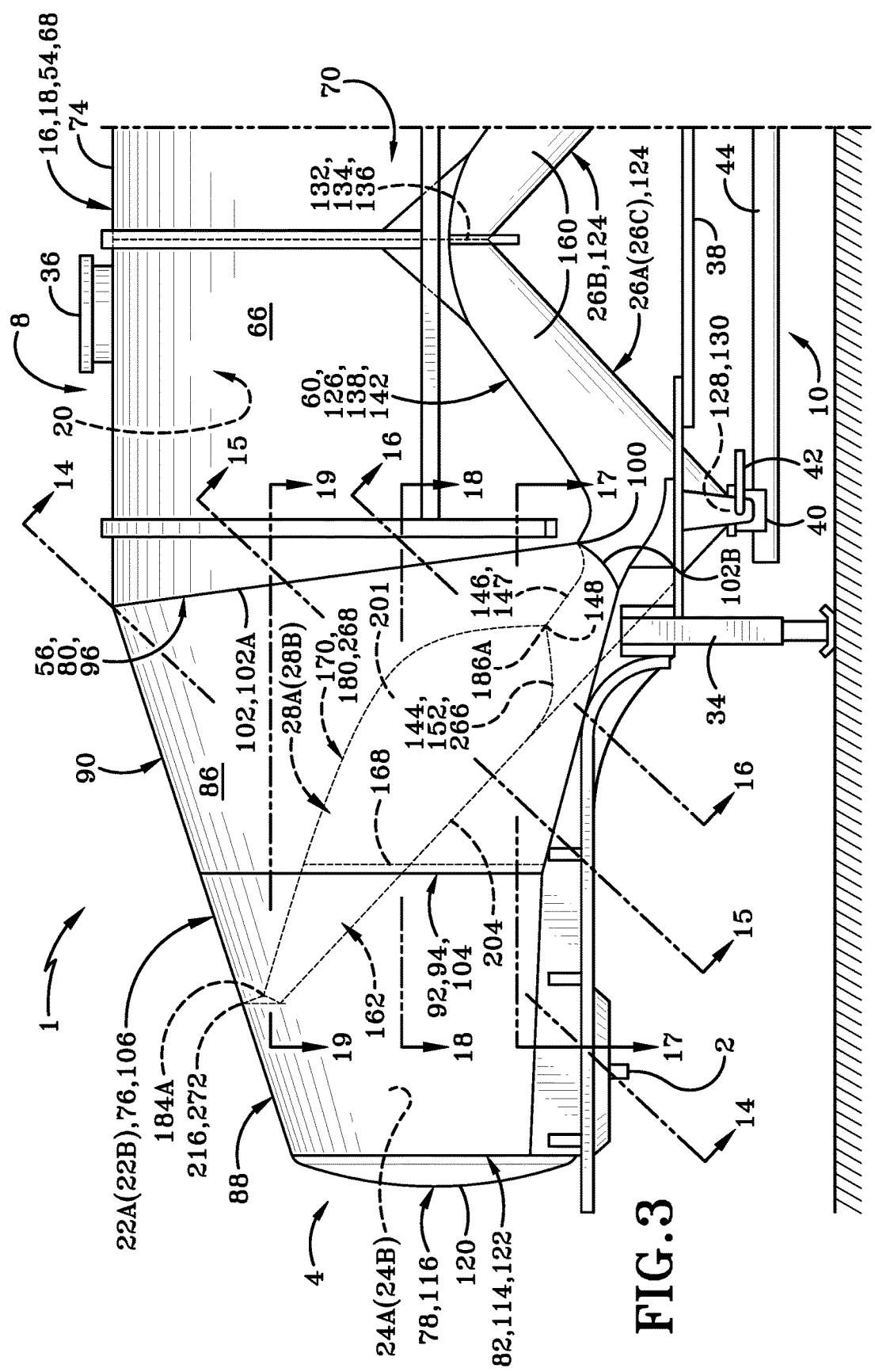
FIG. 3 is an enlarged left side elevation view of a front portion of the trailer.
Figure 4:
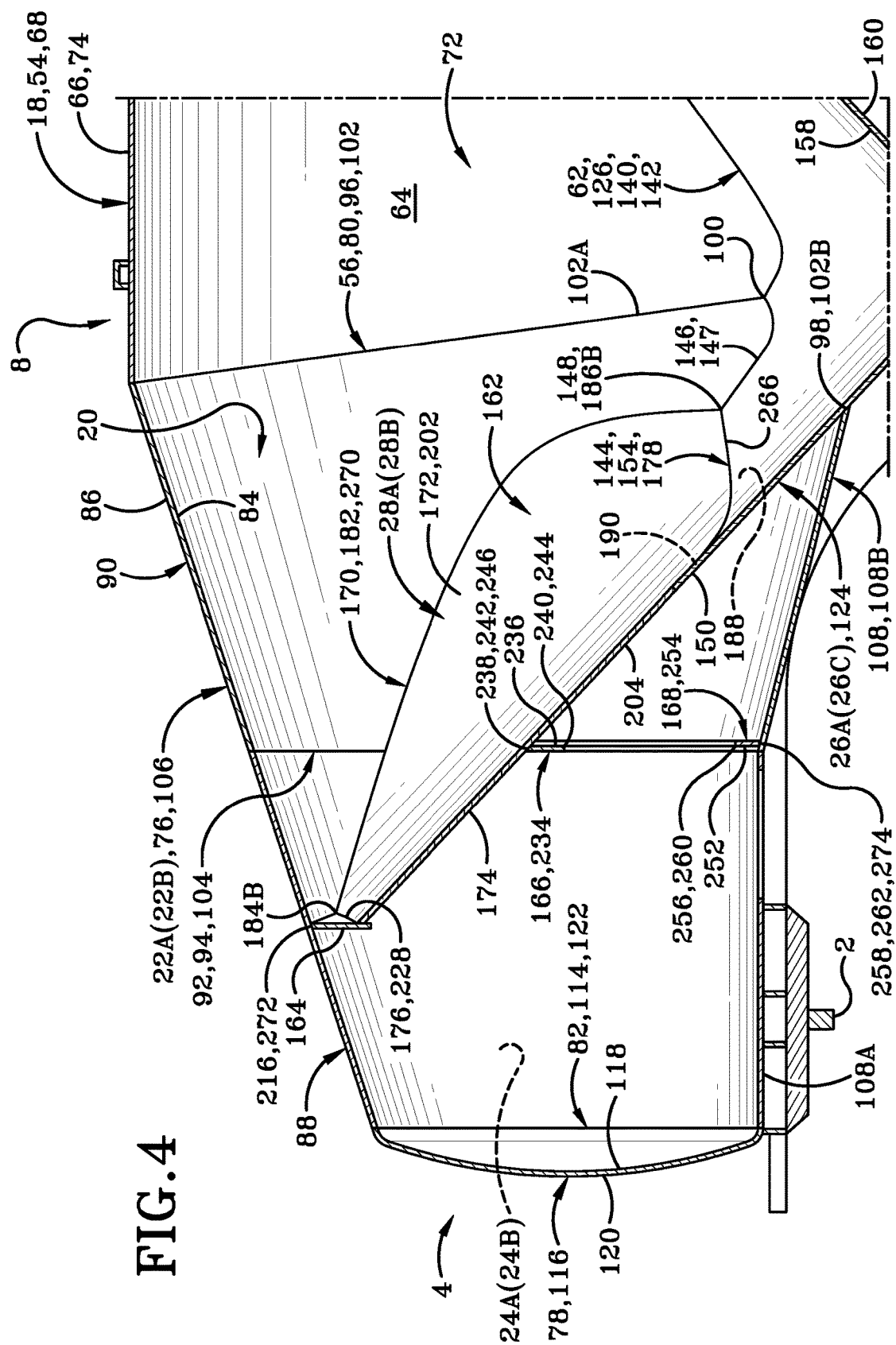
FIG. 4 is a sectional view taken on line 4-4 of FIG. 2.
Figure 5:
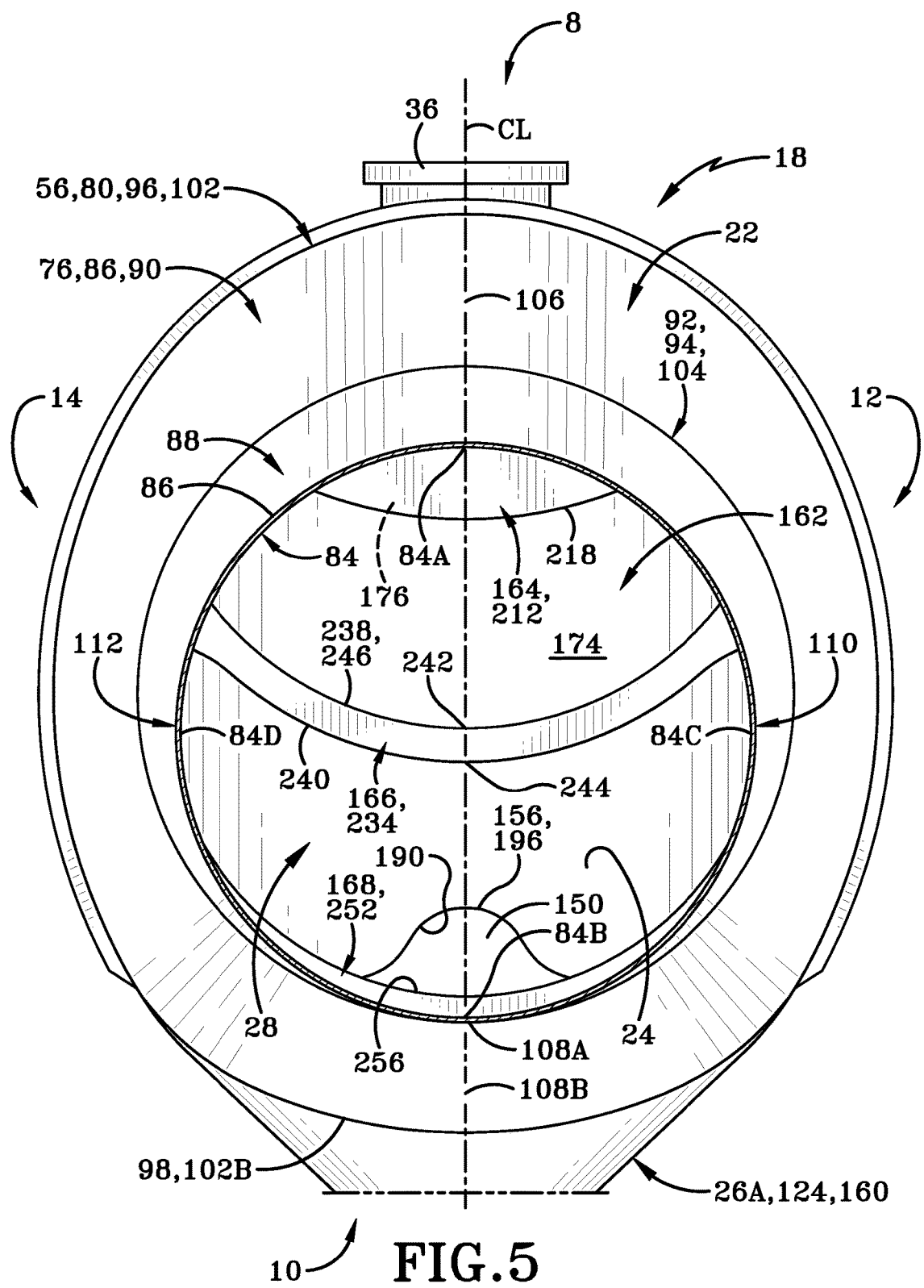
FIG. 5 is an enlarged sectional view taken on each of lines 5-5 of FIG. 1.
Figure 6:
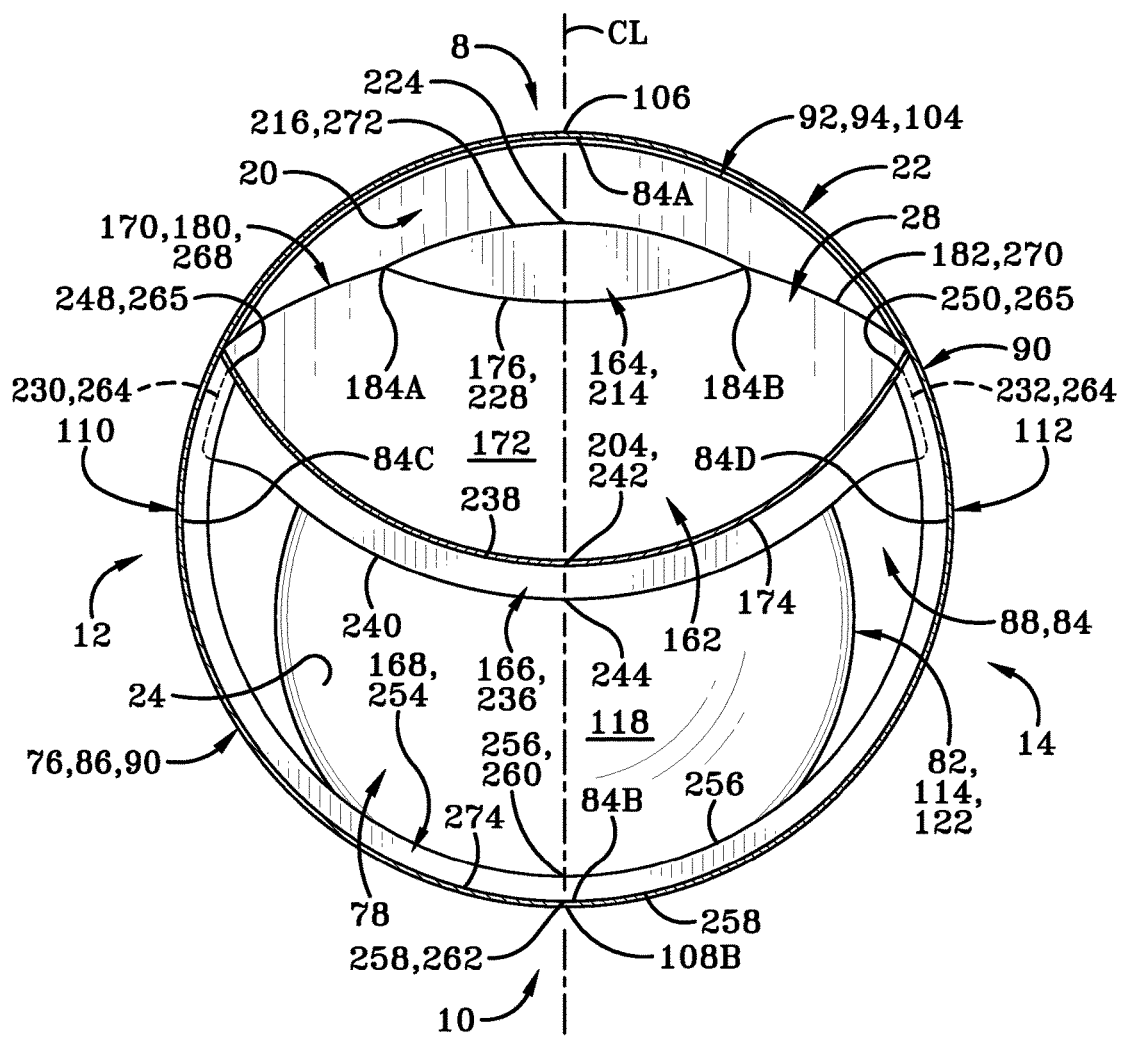
FIG. 6 is an enlarged sectional view taken on each of lines 6-6 of FIG. 1.
Figure 7:
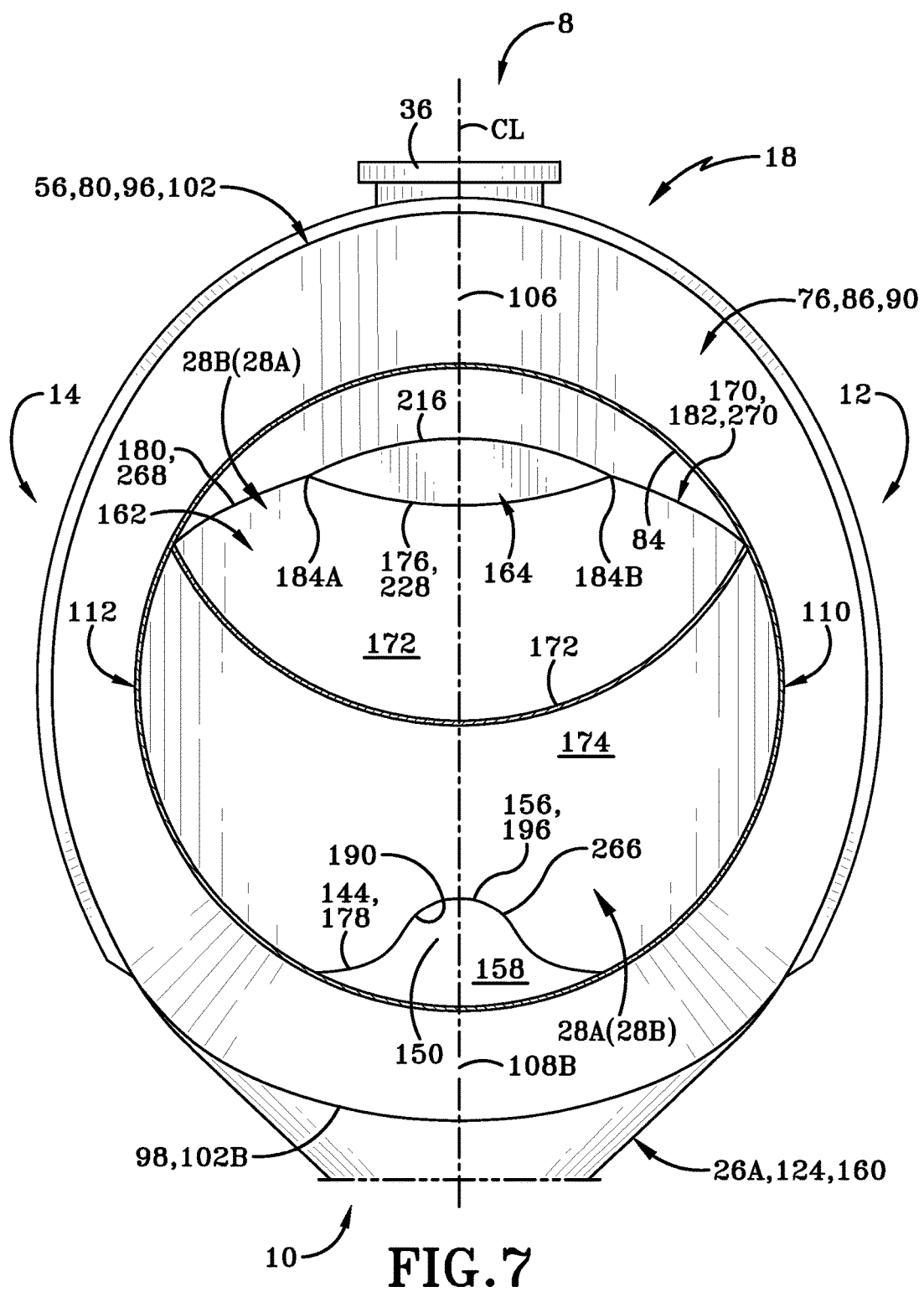
FIG. 7 is an enlarged sectional view taken on each of lines 7-7 of FIG. 1.
Figure 8:
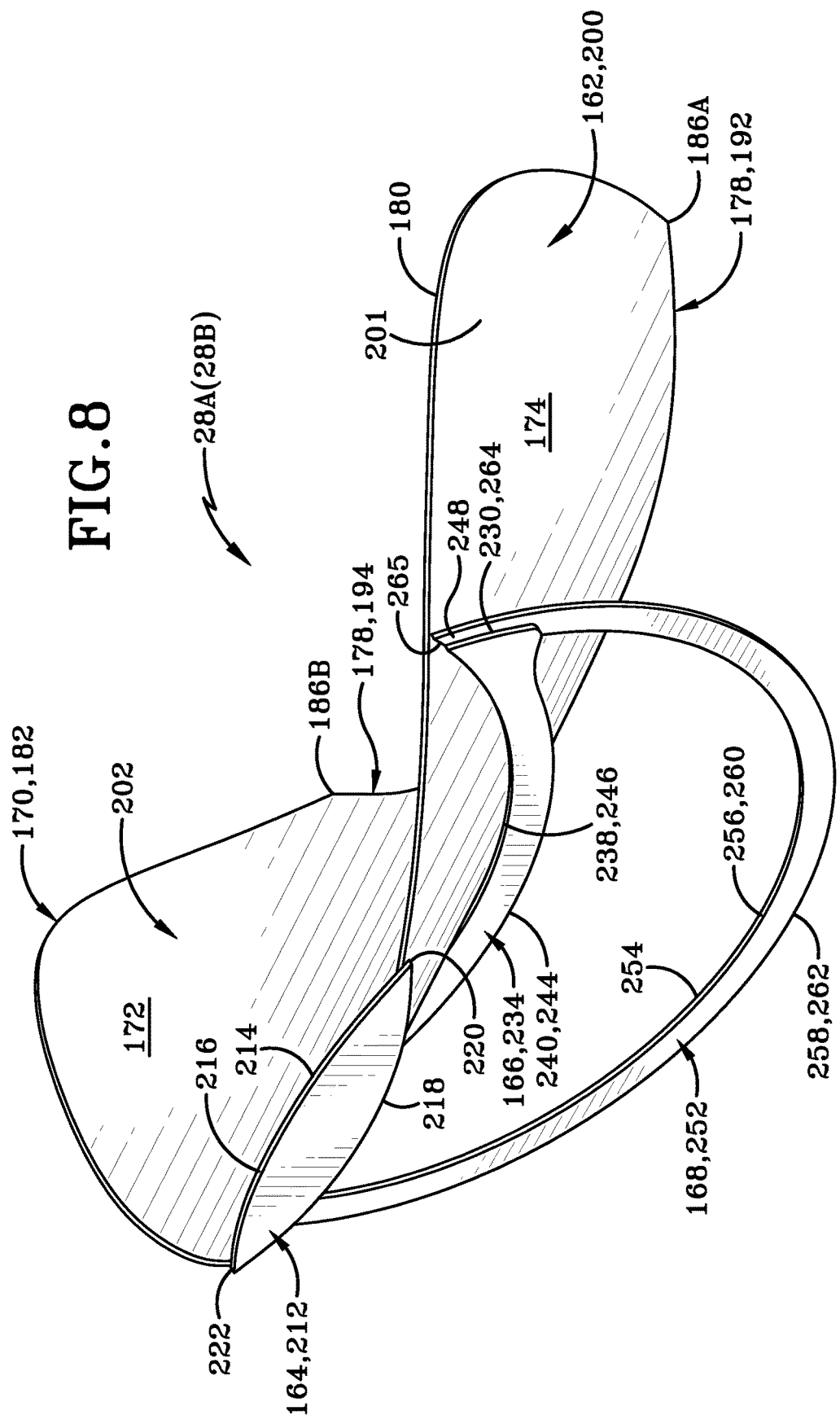
FIG. 8 is a perspective view of the slide plate assembly.

End housing 22A is now described with primary reference to FIGS. 3-7. Sidewall 76 may have a rear or back end or edge 80 and a front end or edge 82. Sidewall 76 may have inner and outer surfaces 84 and 86 each of which may extend from end 80 to end 82. Sidewall 76 may include a first or narrower section 88 and a second or wider section 90 which is rigidly secured to section 88 and extends rearward therefrom. Each of sections 88 and 90 may have a frustoconical configuration. Section 88 may have a rear or back end or edge 92, and section 90 may have a front end or edge 94 which is rigidly secured to end 92. End or edge 82 may also serve as the front end or edge of section 88, whereas back end or edge 80 may serve as the back end or edge of section 90. Back edge 80 may have an upper segment 96 and a lower segment 98 which intersect one another at two intersections 100. More particularly, upper edge segment 96 may have an inverted U-shaped configuration as viewed from the rear (similar to the inverted U-shaped configuration of top wall 54 shown in FIG. 13 in section) so that upper segment 96 may have a left bottom end also represented by 100 in FIG. 3 and a right bottom end also represented by 100 in FIG. 4. Lower edge segment 98 may have a U-shaped configuration as viewed from the front or back, as shown in FIGS. 5 and 7. The left intersection 100 of FIG. 3 may also represent the left top rear end of lower segment 98, while the right intersection 100 shown in FIG. 4 may represent the right top rear end of lower segment 98. Edge 80 as a whole as viewed from the rear may have a generally circular or oval configuration and may be continuous so as to form a closed loop. Upper segment 96 may be straight as viewed from the side and may lie entirely along an upwardly extending plane which may extend axially across trailer 1 and be closely adjacent and parallel to the plane along which front edge 56 of top wall 54 lies, whereby these two planes may be nearly coplanar. Lower segment 98 may curve in a continuous fashion as viewed from the front or as viewed from below from the left intersection or end 100 to the right intersection or end 100. Lower segment 98 may curve concavely in a mating fashion with the convexly curved outer surface of the hopper 26A sidewall. End housing 22A/sidewall 76 may be rigidly secured to top wall 54 and hopper 26A by a weld 102. Weld 102 may include an upper weld segment 102A and a lower weld segment 102B which respectively secure top wall 54 and hopper 26A to end housing 22A sidewall 76. Weld 102 may be a continuous weld along the entirety of back edge 80 and thus have a configuration similar to that of back edge 80. Thus, weld 102 as viewed from the front or back may be generally circular or oval or have a closed loop configuration. As viewed from the front or back, upper weld segment 102A may likewise have the same type of inverted U-shaped configuration as upper segment 96, whereas lower weld segment 102B may have a U-shaped configuration as viewed from the front or back which is essentially the same as that of lower segment 98. Upper weld 102A as viewed from the side may be straight and may lie along a plane which may extend axially across trailer 1 and be closely adjacent and parallel to or coplanar with the two planes along which front edge 56 and upper segment 96 respectively lie. Lower weld 102B may be continuously curved as viewed from the bottom and as viewed from the side from adjacent left intersection/ends 100 to adjacent right intersection/ends 100.

Referring to FIGS. 5-7, sidewall 76 including sections 88 and 90 in cross section (as viewed from the front or rear) may have a circular, oval or other closed loop configuration. Similarly, ends or edges 92, 94 and 82 may have a circular, oval or other closed loop configuration as viewed from the front or back. Section 88 may be rigidly secured to section 90 by a weld 104 (FIGS. 3-4) extending along edges 92 and 94. More particularly, weld 104 may be a continuous weld which extends along the entirety of edges 92 and 94 and which may as viewed from the front or rear have a circular, oval or other closed loop configuration. Edges 92 and 94 and weld 104 may be straight and essentially vertical as viewed from the side and may each lie entirely along a respective axially extending plane which cuts across the trailer and end housing such that the three planes may be closely adjacent and parallel to one another and/or coplanar. Said planes may also be essentially vertical, parallel to plane P and perpendicular to plane CL.

End housing 22A/sidewall 76 may have a longitudinally elongated peak 106 at the intersection of center plane CL and outer surface 86 along the top of sidewall 76. Peak 106 may extend from adjacent the top of front edge 82 to adjacent the top of back edge 80. Housing 22A and sidewall 76 may also have a longitudinally elongated base 108 (which may include bases or base segments 108A and 108B respectively of sections 88 and 90) at the intersection of center plane CL and outer surface 86 along the bottom of sidewall 76. Base 108 may extend from adjacent the bottom of front edge 82 to adjacent the bottom of back edge 80 and lower edge segment 98. Sidewall 76 may have first and second sides 110 and 112 which may respectively serve as left and right sides of the sidewall and end housing. Each of sides 110 and 112 may be longitudinally elongated from front edge 82 to back edge 80.

Figure 2:
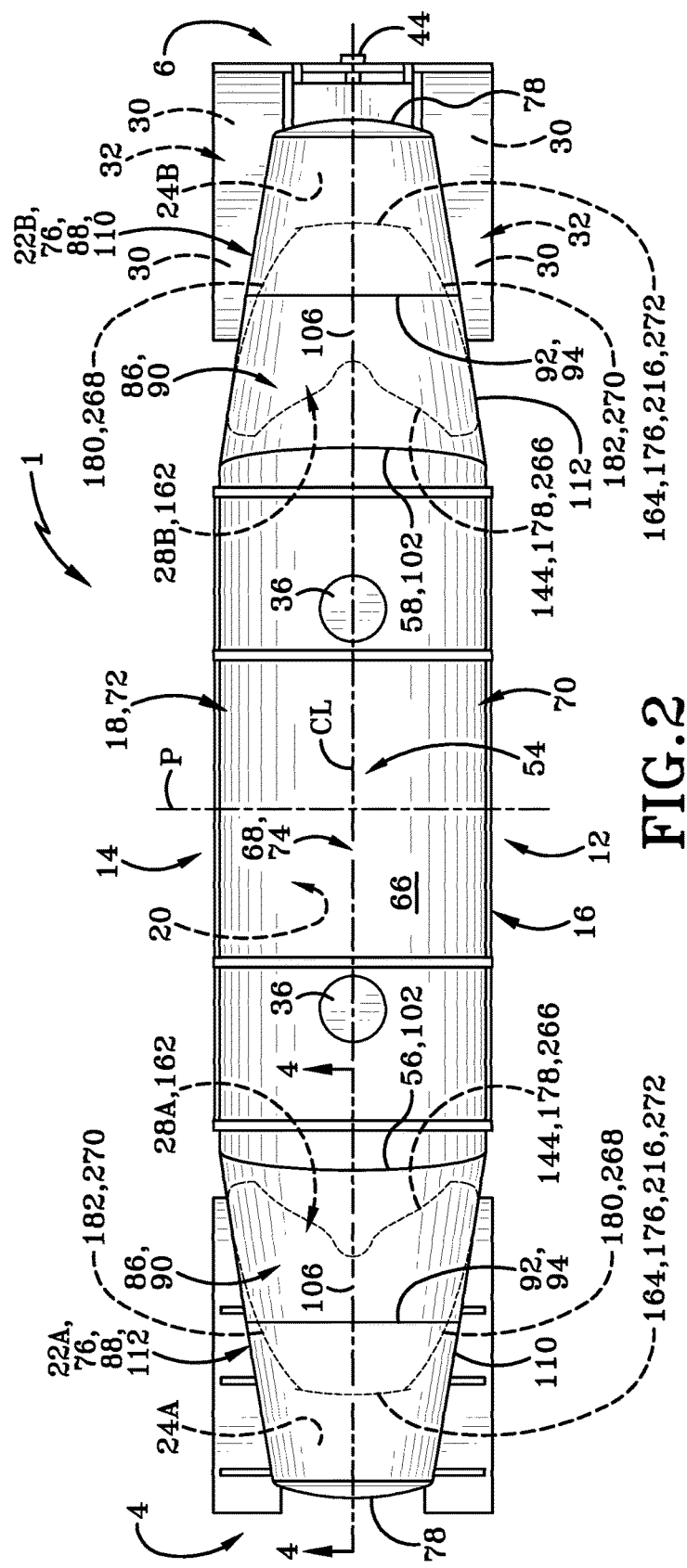
FIG. 2 is a top plan view of the trailer.

This paragraph provides a description as viewed from above (FIG. 2). End housing 22A and sidewalls 76 may taper from back end or edge 80 to front end or edge 82 so as to become increasingly narrower from back to front. Each of sections 88 and 90 may likewise taper to become narrower from the back to the front of the respective section. Left side 110 may taper or angle forward and to the right from adjacent edge 80 to adjacent edge 82. Right side 112 may taper or angle forward and to the left from adjacent back edge 80 to adjacent front edge 82. Sidewall 76 may be axially wider (from left to right perpendicular to plane CL) at or adjacent back end 80 than at ends 92, 94 and 82, and sidewall 76 at ends 92 and 94 may be axially wider than at or adjacent front end 82.

This paragraph provides a description as viewed from the side (FIGS. 3-4).

End housing 22A and sidewall 76 may taper from adjacent back end 80 to adjacent front end 82 so as to narrow from back to front. Wider section 90 may also narrow or taper from back edge 82 to front edge 94, and narrower section 88 may taper or narrow from back edge 92 to front edge 82. Thus, housing 22A and sidewall 76 may be vertically wider at or adjacent back end 80 than at ends or edges 92, 94 and 82. Housing 22A and sidewall 76 may also be vertically wider adjacent ends 92 and 94 than adjacent end 82. Peak 106 may angle or taper downward and forward from adjacent back end 80 to adjacent ends 92, 94 and 82. Peak 106 may likewise taper or angle downward and forward from adjacent ends 92 and 94 to adjacent end 82. Peak 106 may angle downward and forward along a straight line at a constant angle from adjacent back end 80 to adjacent front end 82. Base segment 108B may angle or taper upward and forward from adjacent back edge 80 and edge segment 98 to adjacent edges 92 and 94. Base or base segment 108A may extend forward from base segment 108B along a different angle, for instance such that base segments 108A and 108B may define therebetween an obtuse angle below segments 108A and 108B. Base segment 108A may be essentially horizontal as viewed from the side from back end 92 to front end 82.

As viewed from the front or rear, such as shown in FIGS. 5-7, inner surface 84 of sidewall 76 may be concavely curved in its entirety whereas outer surface 86 may be convexly curved in its entirety. Inner surface 84 may have a downwardly facing top portion 84A extending along the top portion of sidewall 76 and peak 106, an upwardly facing bottom portion 84B extending along the bottom portion of sidewall 76 and base 108, a rightward facing left portion or left side portion 84C extending along the left portion of sidewall 76 and left side 110, and a leftward facing right portion or right side portion 84D extending along the right portion of sidewall 76 and right side 112. As viewed from the rear (FIG. 6), top portion 84A may be continuously concavely curved or have an inverted U-shaped configuration along, for instance, at least a top quarter, top third or top half of sidewall 76 and inner surface 84; bottom portion 84B may be continuously concavely curved or have a U-shaped configuration along, for instance, at least a bottom quarter, bottom third or bottom half of sidewall 76 and inner surface 84; left portion 84C may be continuously concavely curved or have a C-shaped configuration along, for instance, at least a left quarter, left third or left half of sidewall 76 and inner surface 84; and right portion 84D may be continuously concavely curved or have a reverse C-shaped configuration along, for instance, at least a right quarter, right third or right half of sidewall 76 and inner surface 84.

With primary reference to FIGS. 3, 4 and 6, cap wall 78 is now described. As viewed from the front or rear, cap wall may, for instance, have a circular or oval configuration. Cap wall 78 may have first and second ends 114 and 116, and inner and outer surfaces 118 and 120. The first or back end 114 may be an edge which has essentially the same size and shape as edge 82 of sidewall 76 although edge 114 may face rearwardly while edge 82 faces forward. Thus, edge 114 as viewed from the rear may have a circular, oval or other closed loop configuration. Edges 82 and 114 may be straight and vertical as viewed from the side and may lie in respective planes which cut axially across trailer 1 and sidewall 76 and which may be closely adjacent and parallel to one another or nearly coplanar. Said planes may be vertical, parallel to plane P and perpendicular to plane CL. Cap wall 78 may be secured to sidewall 76 by a weld 122 between/along edges 82 and 114. Weld 122 may be a continuous weld extending along the entirety of edges 82 and 114 such that weld 122 may have a circular, oval or other closed loop configuration as viewed from the front or rear. Weld 122 may also be straight and vertical as viewed from the side and lie entirely along a straight and vertical plane which may be parallel and closely adjacent to and/or coplanar with the planes along which edges 82 and 114 lie. Inner or rear surface 118 may face rearward and may be partially or entirely concavely curved as viewed from the side and/or above. Outer or front surface 120 may face forward and be partially or entirely convexly curved as viewed from the side and/or above. Surface 120 may define the front of cap wall 78, end housing 22A and bulk tank assembly 16.

With primary reference to FIGS. 1, 3-5, 7 and 17, each hopper 26 may have a hopper sidewall 124 having a top edge 126 and a bottom edge 128 which defines a bottom exit opening 130. Sidewall 124 may be formed of an aluminum alloy or other suitable metal. Each exit opening 130 is adjacent a respective valve assembly 40 and is in fluid communication with discharge pipe 44 when the given valve assembly 40 is in the open position so as to allow air and particulate material within storage chamber 20 and the given hopper to flow downwardly through exit opening 130 into discharge pipe 44. Each sidewall 124 may taper downwardly and inwardly from adjacent top edge 126 to adjacent bottom edge 128 and opening 130. The top edge 126 of each of hoppers 26A and 26B may have a rear edge segment or portion 132 (FIGS. 1, 3) which may be U-shaped as viewed from the front or rear. The top edge 126 of each of hoppers 26B and 26C may include a front edge segment or portion 134 (FIGS. 1, 3) which may be U-shaped as viewed from the front or rear. Segments 132 and 134 may be essentially of the same size and the same shape. Rear edge segment 132 of hopper 26A and front edge segment 134 of hopper 26B may be closely adjacent and face one another and secured to one another by a weld 136 which may likewise be U-shaped as viewed from the front or rear and extend along the entirety of segments 132 and 134. Similarly, rear edge segment 132 of hopper 26B and front edge segment 134 of hopper 26C may be closely adjacent one another and be secured to one another by a weld 136 which may be U-shaped as viewed from the front or rear and extend along the entirety of segments 132 and 134. Top edge 126 may also include left and right edge segments or portions 138 and 140. Left side bottom edge 60 of top wall 54 may be rigidly secured to the left edge segments 138 of hopper sidewalls 124 of each of the hoppers by a weld 142 which may extend in a continuous fashion along the entirety of bottom edge 60 or from adjacent the front end or intersection 100 of edge 60 to the back end or intersection 100 of bottom edge 60. Right side bottom edge 62 of top wall 54 may likewise be secured to right edge segment 140 of the sidewalls of each of the hoppers by an analogous weld 142 along the right side, as partially shown in FIG. 4. The top edge 126 of frontmost hopper 26A/sidewall 124 may have a front edge segment or portion 144 extending from the front of left edge segment 138 to the front of right edge segment 140. Similarly, the top edge 126 of rearmost hopper 26C/sidewall 124 may have a rear edge segment or portion also represented by number 144 which extends from the back or rear end of left edge segment 138 to the back or rear end of right edge segment 140.

Each of left edge segments 138 and 140 may have a forward edge portion 146 shown in FIGS. 3, 4, 13 and 17. The left forward edge portion 146 of left segment 138 may extend forward from adjacent the front left intersection 100, the left bottom end (also 100) of upper segment 96 along left section 70, and the left top rear end (also 100) of lower segment 98 along left section 70 to a front left intersection 148 between the front end of left edge segment 138 and the left end of front edge segment 144. The right forward edge portion 146 of right segment 140 may extend forward from adjacent the front right intersection 100, the right bottom end (also 100) of upper segment 96 along right section 72, and the right top rear end (also 100) of lower segment 98 along right section 72 to a front right intersection 148 between the front end of right edge segment 140 and the right end of front edge segment 144. The left forward edge portion 146 of left segment 138 may be secured to inner surface 84 of end housing 22A sidewall 84 by a weld 147 (FIGS. 3, 13, 17) which may extend along left portion 84C and the entirety of said left portion 146. The right forward edge portion 146 of right segment 140 may be secured to inner surface 84 of end housing 22A sidewall 84 by an analogous weld 147 (FIGS. 13, 17) which may extend along right portion 84D and the entirety of said right portion 146. Sidewall 124 of front hopper 26A may have a front tongue 150 which projects upwardly and forward beyond the left and right portions of the front half of sidewall 124. Thus, front edge segment 144 may have first and second side portions (here left and right side portions) 152 and 154 and a central portion 156 therebetween which extends forward and upward of portions 152 and 154.

Each of hopper sidewalls 124 may have inner and outer surfaces 158 and 160 each of which extends continuously from top edge 126 to bottom edge 128. Each sidewall 124 and its inner and outer surfaces 158 and 160 may taper or angle downwardly and inwardly from top edge 126 to bottom edge 128 and exit opening 130. The front portions of each sidewall 124 and the inner and outer surfaces 158 and 160 thereof may angle downward and rearward from adjacent the front of the given top edge 126 to adjacent the front of the given bottom edge 128, whereas the rear portion of each sidewall 124 and the inner and outer surfaces 158 and 160 thereof may angle downward and forward from adjacent the back end of the given top edge 126 to the back end of the given bottom edge 128, as shown in FIGS. 1, 3 and 4. Similarly, the left portion of each sidewall 124 and the inner and outer surfaces 158 and 160 thereof may angle downward to the right from adjacent left edge segment 138 to adjacent the left side of bottom edge 128 and exit opening 130, whereas the right side of each sidewall 124 and its inner and outer surfaces 158 and 160 may angle downward to the left from adjacent right edge segment 140 to the right side of bottom edge 128 and exit opening 130, as generally illustrated in FIGS. 5, 7 and 13.

With primary reference to FIGS. 8-12, front slide plate assembly 28A may include a slide plate 162, an end plate 164, a support flange 166 and a rib 168 which may all be rigidly secured together as a rigid unit and which may be rigidly secured to hopper 26A sidewall 124 and end housing 22A sidewall 76 and extend within sidewall 76 and housing 22A (FIGS. 1-4). Each of slide plate 162, end plate 164, flange 166 and rib 168 may be formed an aluminum alloy or other suitable metal. Slide plate assembly 28A may be entirely within housing 22A. Slide plate 162 may have an outer perimeter edge 170 which extends all the way around the outer perimeter of plate 162 in a continuous manner to form a closed loop configuration. Plate 162 may have a slide plate inner surface 172 and a slide plate outer surface 174 which face away from one another and which each extend continuously along plate 162 within outer perimeter edge 170. Outer perimeter edge 170 may have a front edge segment or portion 176, a rear or back edge segment or portion 178, a first or left side edge segment or portion 180 and a second or right side edge segment or portion 182. Each of inner and outer surfaces 172 and 174 may extend continuously from front segment 176 to rear segment 178 and from left segment 180 to right segment 182. The front upper end of left segment 180 may intersect the left end of front segment 176 at a front upper left intersection 184A. Numeral 184A may also represent the front end of segment 180 and the left end of segment 176. Similarly, the front upper end of right segment 182 and the right end of segment 176 may intersect one another at a front upper right intersection 184B. Numeral 184B may also represent the front upper end of segment 182 and the right end of segment 176. The rear lower end of left segment 180 and the left end of rear segment 178 may intersect at a left lower rear intersection 186A. Numeral 186A may also represent the rear lower end of segment 180 and the left end of segment 178. The rear lower end of right segment 182 and the right end of rear segment 178 may intersect at a right lower rear intersection 186B. Numeral 186B may also represent the rear end of segment 182 and the right end of segment 178. Left side edge segment 180/slide plate 162 may have a leftmost point 206, and right side edge 182/slide plate 162 may have a rightmost point 208. Points 206 and 208 may be longitudinally adjacent and forward of intersections/ends 186A and 186B and longitudinally distal and rearward of front edge 176/intersections/ends 184A and 184B/end plate 164, as may be understood as viewed from above as in FIG. 10.

As viewed from the rear (FIG. 13), left edge segment 180 may be continuously curved from adjacent its front upper end 184A to adjacent its rear lower end 186A so as to have a C-shaped configuration from adjacent end 184A to adjacent end 186A; left edge segment 180 may curve downward to the left from adjacent front upper end 184A to adjacent leftmost point 206 and may curve downward to the right from leftmost point 206 to rear lower end 186A; right edge segment 182 may be continuously curved from adjacent its front upper end 184B to adjacent its rear lower end 186B so as to have a reverse C-shaped configuration from adjacent end 184B to adjacent end 186B; right edge segment 182 may curve downward to the right from adjacent front upper end 184B to adjacent rightmost point 208 and may curve downward to the left from rightmost point 208 to rear lower end 186B.

Rear edge 178 may define a hopper sidewall receiving space 188 including a narrower tongue-receiving cutout 190. Back edge segment 178 may include a first or left side portion 192, a second or right side portion 194 and a central portion 196 therebetween. Left side portion 192 may extend from left end 186A of segment 178 to the left side of central portion 196, whereas right side portion 194 may extend from right end 186B of segment 178 to the right side of central portion 196. Central portion 196 may define cutout 190. Slide plate 162 may include a central section or portion 198, a left side section or portion 200 and a right side section or portion 202. Slide plate outer surface 174 along each of side sections 200 and 202 may include a side section surface 201 respectively adjacent side edge segments 180 and 182. Central section 198 may define front edge segment 176, central portion 196, and portions of left and right side portions 192 and 194. Left side section 200 may define the entirety of left edge segment 180 and part or all of left side portion 192. Right side section 202 may define the entirety of right edge segment 182 and part or all of right side portion 194. The rear portion of left side section 200 and the rear portion of right side section 202 may define therebetween space 188 and cutout 190. Plate 162 may have a longitudinally elongated base 204 which may extend from front end or edge 176 to rear end or edge 178 and may be defined by an intersection between central plane CL and outer surface 174 of plate 162. Base 204 may extend from the center of edge 176 midway between ends 184A and 184B to the center of back edge 178 and section 196 midway between ends 186A and 186B. Base 204 may be a straight line and angle downward and rearward from adjacent front edge 176 to adjacent back edge 178/portion 196. Plate 162 may generally be at an angle such that inner surface 172 faces upward and rearward and outer surface 174 faces forward and downward.

Figure 11:
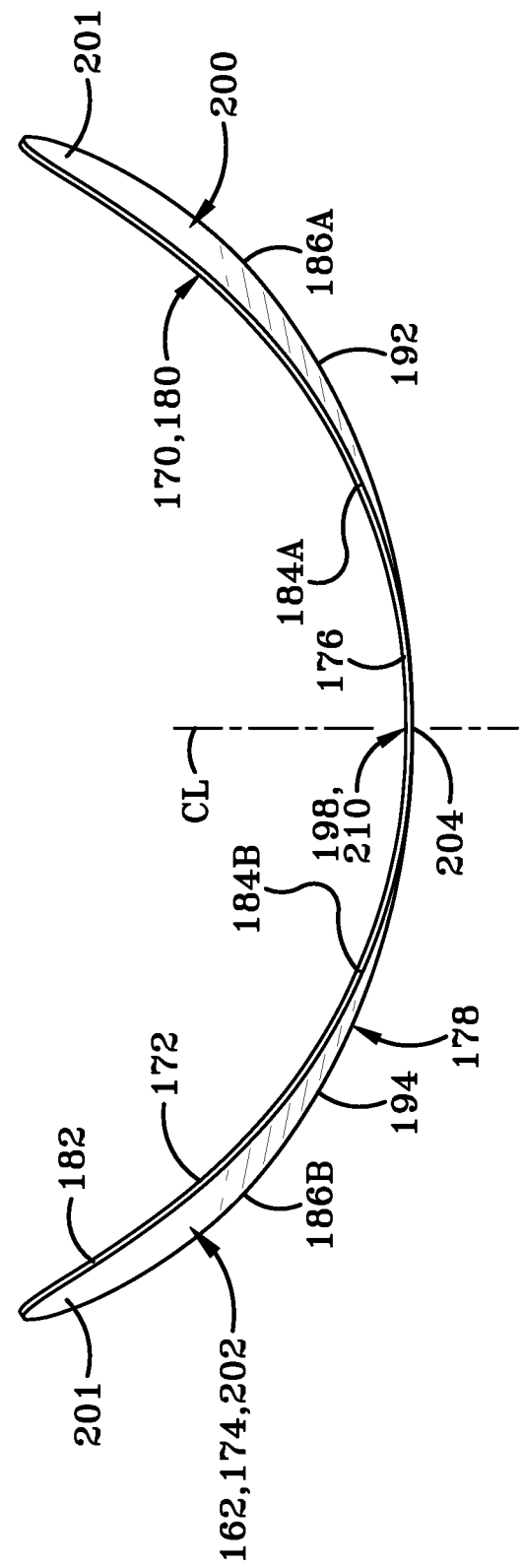
FIG. 11 is an end view of the slide plate looking longitudinally downward on an angle from the upper end toward the lower end of the slide plate.

This paragraph discusses slide plate 162 of assembly 28A as viewed in a downward and rearward direction such as shown in FIG. 11. This downward and rearward direction may be along base 204 from front edge segment 176 to back edge segment 178. This downward and rearward direction may also be along a line V1 (FIG. 1) which may be parallel or essentially parallel to base 204 and generally from the top front end of plate 162 toward the bottom rear end of plate 162. Line V1 may lie in plane CL or a plane parallel to plane CL. This downward and rearward direction may be at about a 45-degree angle (for instance, plus or minus 5 or 10 degrees) to horizontal as viewed from the side of assembly 28A/trailer 1. Slide plate 162 of assembly 28A may have a U-shaped configuration which may extend from the left edge segment 180 to the right edge segment 182 or from leftmost point or portion 206 of plate 162 to rightmost point or portion 208 of plate 162. Inner surface 172 may in its entirety be continuously concavely curved. Thus, inner surface 172 of any or all of sections 198, 200 and 202 may be entirely continuously concavely curved. Inner surface 172 may be continuously concavely curved from a first given point on or adjacent surface 172 to any other second given point on or adjacent surface 172 which is axially offset from the first given point, that is, to the left or right of the first given point. For instance, surface 172 may be continuously concavely curved from any of the following components or locations to any other of the following components or locations which is axially offset therefrom: leftmost point 206, rightmost point 208, left side edge segment 180, right side edge segment 182, left front intersection 184A (or left end 184A of front edge segment 176 or the left front upper end 184A of left side edge segment 180), right front intersection 184B (or right end 184B of front edge segment 176 or the right front upper end 184B of right edge segment 182), an axial center 210 of plate 162/surface 172 midway between the leftmost and rightmost points 206 and 208, the intersection between center plane CL and inner surface 172, and so forth. Outer surface 174 may be continuously convexly curved in a similar manner between the same or analogous axially offset components or locations.

Figure 9:
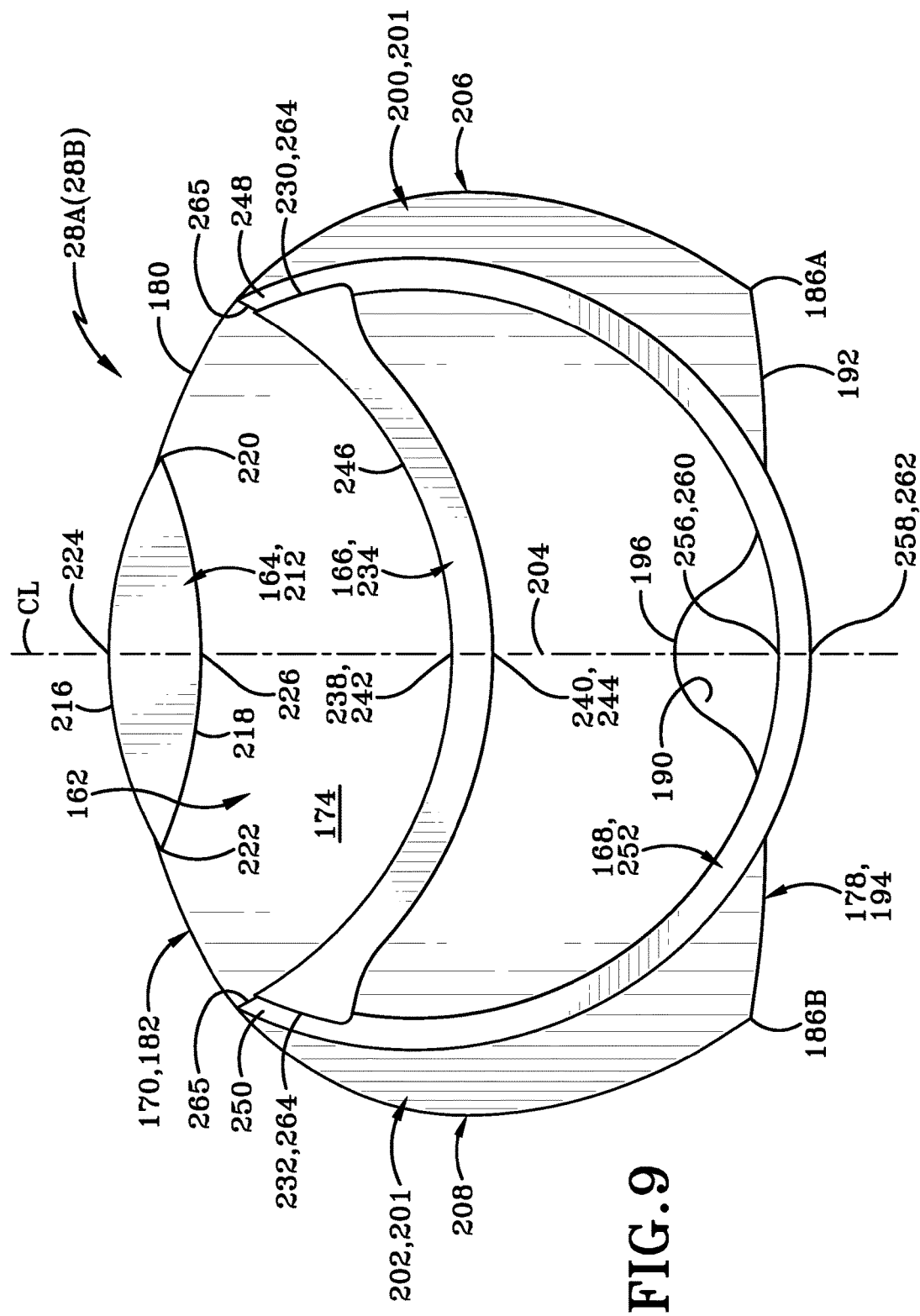
FIG. 9 is a front or rear elevation view of the slide plate assembly.
Figure 10:
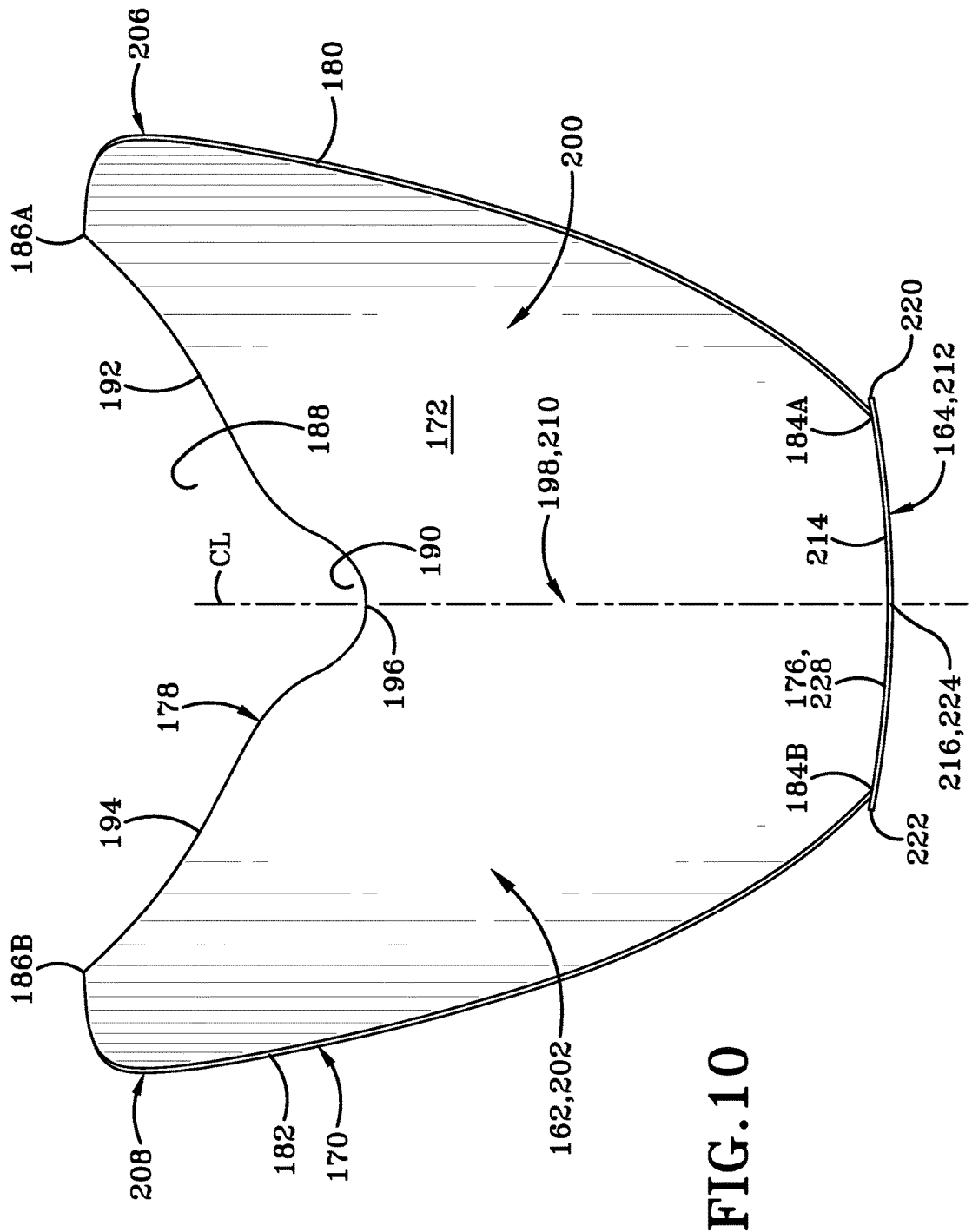
FIG. 10 is a top plan view of the slide plate assembly.

With primary reference to FIGS. 8-10 and 12, end plate 164 of assembly 28A is now described. End plate 164 may be generally flat and vertical although it may be slightly curved as viewed from above (FIG. 10). End plate 164 may have a forward facing front surface 212, a rearward facing rear or back surface 214, an upward facing top edge 216 and a downward facing bottom edge 218. Top and bottom edges 216 and 218 at respective left ends thereof may intersect one another at a left intersection or leftward pointing tip 220 which may be V-shaped as viewed from the front or rear. Top and bottom edges 216 and 218 at respective right ends thereof may intersect one another at a right intersection or rightward pointing tip 222 which may be V-shaped as viewed from the front or rear. Top edge 216 may have an uppermost point or peak 224 which may be axially midway between left and right ends 220 and 222 of edge 216 or midway between intersections 220 and 222 and/or at the intersection of top edge 216 and plane CL. Bottom edge 218 may have a lowermost point or base 226 which may be axially midway between left and right ends 220 and 222 of edge 218 or midway between intersections 220 and 222 and/or at the intersection of bottom edge 218 and plane CL. Front and rear surfaces 212 and 214 may be flat or nearly flat or planar and essentially vertical. As viewed from above, front surface 212 may be slightly convexly curved and rear surface 214 may be slightly concavely curved. In cross section taken at plane CL and/or at peak 224 and base 226, plate 164 and surfaces 212 and 214 may be straight and vertical, as shown in FIG. 4. As viewed from the front (FIG. 9) or rear, top edge 216 may have an inverted U-shaped configuration and/or be continuously convexly curved from adjacent left end or tip 220 to adjacent right end or tip 222, and bottom edge 218 may have a U-shaped configuration and/or be continuously convexly curved from adjacent left end or tip 220 to adjacent right end or tip 222. Top edge 216 may curve continuously downward to the left from peak 224 to left end/intersection 220 and downward to the right from peak 224 to right end/intersection 222. Bottom edge 218 may curve continuously upward to the left from base 226 to left end/intersection 220 and upward to the right from base 226 to right end/intersection 222. Plate 164 and front surface 212 may have a football shape or eye shape as viewed from the front. Similarly, back surface 214 may have a football shape or eye shape as viewed from the rear.

Figure 12:
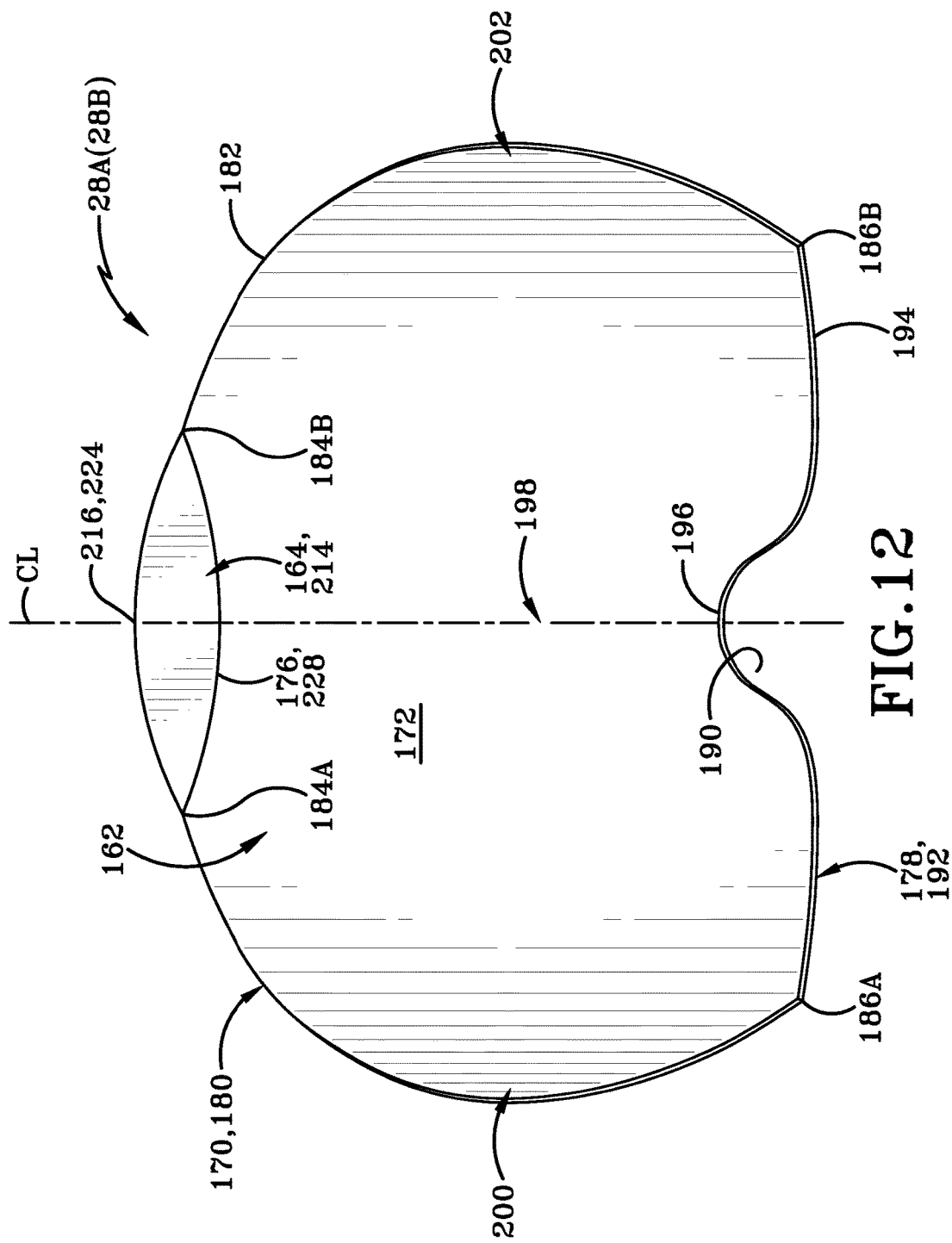
FIG. 12 is a rear or front elevation view of the slide plate assembly without the arcuate rib (opposite the view in FIG. 9).

Back surface 214 along bottom edge 218 may be closely adjacent or in contact with front edge segment 176 along the entirety of segment 176 from adjacent left end 184A to adjacent right end 184B. End plate 164 may be rigidly secured to slide plate 162 by a weld 228 (FIGS. 10, 12) between plates 162 and 164 adjacent front edge segment 176 of slide plate 162 and rear surface 214 of end plate 164. Weld 228 may extend continuously along the entirety of front edge segment 176 from adjacent left end 184A to adjacent right end 184B and along bottom edge 218 from adjacent left end or tip 220 to adjacent right end or tip 222. Weld 228 may have U-shaped configuration as viewed from the rear (FIG. 12). Plate 164 may extend upwardly of plate 162/inner surface 172 adjacent front edge segment 176. Plate 164 may extend from adjacent the front end 184A of left edge segment 180 to adjacent the front end 184B of right edge segment 182. Left and right ends/intersections/tips 220 and 222 may be respectively adjacent left and right ends/intersections 184A and 184B. Left end/tip/intersection 220 may be axially inward of, inboard of or spaced to the right of left end/intersection 186A and leftmost point 206, and right end/tip/intersection 222 may be axially inward of, inboard of or spaced to the left of right end/intersection 186B and rightmost point 208. Base 226 of bottom edge 218 may be adjacent base 204 of outer surface 174/plate 162 adjacent front end 176.

With primary reference to FIGS. 4-6, 8 and 9, support flange 166 of assembly 28A is now described. Flange 166 may have left and right ends 230 and 232 between which flange 166 is axially elongated. Flange 166 may be U-shaped from adjacent end 230 to adjacent end 232 as viewed from the front (FIG. 9). Flange 166 may have a forward facing front surface 234, a rearward facing rear or back surface 236, an upward facing top edge 238 and a downward facing bottom edge 240 each of which extends from adjacent end 230 to adjacent end 232. Flange 166 and surfaces 234 and 236 may be essentially flat and vertical (as shown in section from the side in FIG. 4) and may lie entirely along respective vertical axially extending planes which may be adjacent and parallel to one another, parallel to plane P and perpendicular to plane CL. Top edge 238 may have a lowermost point or base 242 which may be axially midway between left and right ends 230 and 232 and/or at the intersection of top edge 238 and plane CL. Bottom edge 240 may have a lowermost point or base 244 which may be axially midway between left and right ends 230 and 232 and/or at the intersection of bottom edge 240 and plane CL. As viewed from the front (FIG. 9), top edge 238 may have a U-shaped configuration and/or be continuously concavely curved from adjacent left end 230 to adjacent right end 232, bottom edge 240 may have a U-shaped configuration and/or be continuously convexly curved from adjacent left end 230 to adjacent right end 232, and front surface 234 may have a U-shaped configuration from adjacent left end 230 to adjacent right end 232. Top edge 238 may curve continuously upward to the left from base 242 to adjacent left end 230 and upward to the right from base 242 to adjacent right end 232. Bottom edge 240 may curve continuously upward to the left from base 244 to adjacent left end 230 and upward to the right from base 244 to adjacent right end 232. Front and rear surfaces 234 and 236 may curve continuously upward to the left from adjacent bases 242 and 244 to adjacent left end 230 and upward to the right from adjacent bases 242 and 244 to adjacent right end 232.

Left and right ends 230 and 232 of flange 166 may be respectively adjacent left and right edge segments 180 and 182 of plate 162 so that flange 166 may extend from adjacent left edge segment 180 to adjacent right edge segment 182. Top edge 238 may be closely adjacent or in contact with plate 162 outer surface 174 along the entirety of top edge 238 from adjacent left end 230 to adjacent right end 232 and from adjacent left edge segment 180 to adjacent right edge segment 182 of plate 162. Slide plate 162/outer surface 174 may be seated on top edge 238. Base 242 of top edge 238 may be closely adjacent or in contact with plate 162 base 204. Flange 166 may be rigidly secured to slide plate 162 by a weld 246 (FIGS. 4, 5, 8, 9) between plate 162 and flange 166 along top edge 238 and outer surface 174. Weld 246 may extend continuously along the entirety of top edge 238 from adjacent left end 230 to adjacent right end 232 and from adjacent left edge segment 180 to adjacent right edge segment 182 of plate 162. Weld 246 may have U-shaped configuration as viewed from the front (FIG. 9). Flange 166 may be directly below plate 162 and may extend downward from adjacent outer surface 174 and top edge 238 to bottom edge 240. Flange 166 in its entirety may be spaced rearward of and lower than end plate 164 in its entirety. Thus, ends 230 and 232, edges 238 and 240, and surfaces 234 and 236 may be rearward of and lower than surfaces 212 and 214, edges 216 and 218, and tips 220 and 222. Left end 230 may be axially outward of, outboard of or spaced to the left of left end/tip/intersection 220, and right end 232 may be axially outward of, outboard of or spaced to the right of right end/tip/intersection 222. Flange 166 in its entirety may be spaced forward of and higher than rear lower end/edge 178 of plate 162. Thus, ends 230 and 232, edges 238 and 240, and surfaces 234 and 236 may be forward of and higher than edge 178 including segments 152, 154 and 156, ends/intersections 186A and 186B and space 188/cutout 190. Left end 230 may be axially inward of, inboard of or spaced to the right of left end/intersection 186A and leftmost point 206, and right end 232 may be axially inward of, inboard of or spaced to the left of right end/intersection 186B and rightmost point 208.

With primary reference to FIGS. 4, 6, 8 and 9, arcuate rib 168 of assembly 28A is now described. Rib 168 may have left and right top or upper ends 248 and 250 between which rib 168 may be axially and vertically elongated. Rib 168 may be U-shaped from adjacent end 248 to adjacent end 250 as viewed from the front (FIG. 9). Rib 168 may have a forward facing front surface 252, a rearward facing rear or back surface 254, an upward facing top edge 256 and a downward facing bottom edge 258 each of which extends from adjacent end 248 to adjacent end 250. Rib 168 and surfaces 252 and 254 may be essentially flat and vertical (as shown in section from the side in FIG. 4) and may lie entirely along respective vertical axially extending planes which may be adjacent and parallel to one another, parallel to plane P and perpendicular to plane CL. Top edge 256 may have a lowermost point or base 260 which may be axially midway between left and right ends 248 and 250 and/or at the intersection of top edge 256 and plane CL. Bottom edge 258 may have a lowermost point or base 262 which may be axially midway between left and right ends 248 and 250 and/or at the intersection of bottom edge 258 and plane CL. As viewed from the front (FIG. 9) or rear, top edge 256 may have a U-shaped configuration and/or be continuously concavely curved from adjacent left end 248 to adjacent right end 250, bottom edge 258 may have a U-shaped configuration and/or be continuously convexly curved from adjacent left end 248 to adjacent right end 250, and front surface 252 may have a U-shaped configuration from adjacent left end 248 to adjacent right end 250. Top edge 256 may curve continuously upward to the left from base 260 to a leftmost point of top edge 256 and upward to the right from the leftmost point of top edge 256 to adjacent left end 248. Top edge 256 may curve continuously upward to the right from base 260 to a rightmost point of top edge 256 and upward to the left from the rightmost point of top edge 256 to adjacent right end 250. Bottom edge 258 may curve continuously upward to the left from base 262 to a leftmost point of bottom edge 258 and upward to the right from the leftmost point of bottom edge 258 to adjacent left end 248. Bottom edge 258 may curve continuously upward to the right from base 262 to a rightmost point of bottom edge 258 and upward to the left from the rightmost point of bottom edge 258 to adjacent right end 250. Front and rear surfaces 252 and 254 may curve continuously upward to the left from adjacent bases 260 and 262 to adjacent the leftmost points of edges 256 and 258 and upward to the right from the leftmost points of edges 256 and 258 to adjacent left end 248. Front and rear surfaces 252 and 254 may curve continuously upward to the right from adjacent bases 260 and 262 to adjacent the rightmost points of edges 256 and 258 and upward to the left from the rightmost points of edges 256 and 258 to adjacent right end 250.

Left and right ends 248 and 250 of rib 168 may be closely adjacent or in contact with plate 162 outer surface 174 and may be respectively adjacent left and right edge segments 180 and 182 of plate 162 so that rib 168 may extend from adjacent left edge segment 180 to adjacent right edge segment 182. Rib 168 may extend downwardly from left and right ends 248 and 250 away outer surface 174 so that the bottom of rib 168 and bases 260 and 262 are lower than and distal outer surface 174 and bases 242 and 244 of flange 166. Rib 168 adjacent left and right ends 248 and 250 may be rigidly secured to slide plate 162 by respective welds 265 (FIG. 9) between plate 162 outer surface 174 and rib 168 ends 248 and 250. Rib 168 may be rigidly secured to flange 166 by a first or left weld 264 (FIG. 9) between left end 248 and left end 230 and by a second or right weld 264 between right end 250 and right end 232.

Rib 168 in its entirety may be spaced rearward of and lower than end plate 164 in its entirety. Thus, ends 248 and 250, edges 256 and 258, and surfaces 252 and 254 may be rearward of and lower than surfaces 212 and 214, edges 216 and 218, and tips 220 and 222. Left end 248 may be axially outward of, outboard of or spaced to the left of left end/tip/intersection 220, and right end 250 may be axially outward of, outboard of or spaced to the right of right end/tip/ intersection 222. Rib 168 in its entirety may be spaced forward of rear lower end/edge 178 of plate 162. Ends 248 and 250 may be higher than (and bases 260 and 262 may be lower than) edge 178 including segments 152, 154 and 156, ends/intersections 186A and 186B and space 188/cutout 190. Left end 248 may be axially inward of, inboard of or spaced to the right of left end/intersection 186A and leftmost point 206, and right end 250 may be axially inward of, inboard of or spaced to the left of right end/intersection 186B and rightmost point 208.

With primary reference to FIGS. 1, 3 and 4, slide plate 162 of assembly 28A may extend or angle upward and forward from adjacent plate 162 lower rear edge 178 and upper front edge 144 of hopper 26A sidewall 124 to adjacent plate 162 front upper edge/end 176, end plate 164 and the top of end housing 22A sidewall 76, portion 84A of sidewall 76 inner surface 84 and peak 106. Slide plate assembly 28A may be entirely forward of front end/edge 56 of top wall 54 and exit opening 130 of front hopper 26A. A front portion of plate 162 including front edge 176 may be inside end housing 22A sidewall 76 narrower section 88 and a rear portion of plate 162 including rear edge 178 may be inside end housing 22A wider section 90. End plate 164 may be entirely within narrower section 88. Flange 166 and rib 168 may be adjacent ends/edges 92 and 94 and weld 104 and may be spaced entirely forward of front edge 144 of hopper 26A sidewall 124.

With primary reference to FIG. 13, this paragraph describes some of the relationships between assembly 28A, front hopper 26A and end housing 22A. Bottom rear edge segment 178 of assembly 28A plate 162 may be closely adjacent or in contact with top front edge segment 144 of front hopper 26A along the entire length of each of segments 178 and 144, with left portions 152 and 192 closely adjacent or in contact with one another, with right portions 154 and 194 closely adjacent or in contact with one another and with central portions 156 and 196 closely adjacent or in contact with one another. Intersection/ends 186A may be closely adjacent or in contact with left intersection/ends 148, and intersection/ends 186B may be closely adjacent or in contact with right intersection/ends 148. The front portion of hopper 26A sidewall 124 may be received in space 188 and tongue 150 may be received in cutout 190. Left edge 180 of plate 162 may in its entirety be closely adjacent or in contact with inner surface 84 of sidewall 76 primarily along left portion 84C and into top portion 84A from adjacent intersection/ends 186A and left intersection/ends 148 to adjacent intersection/ends 184A and intersection/ends/tip 220. Right edge 182 of plate 162 may in its entirety be closely adjacent or in contact with inner surface 84 of sidewall 76 primarily along right portion 84D and into top portion 84A from adjacent intersection/ends 186B and right intersection/ends 148 to adjacent intersection/ends 184B and intersection/ends/tip 222. Top edge 216 of end plate 164 may in its entirety be closely adjacent or in contact with inner surface 84 of sidewall 76 along top portion 84A from adjacent intersection/ends 184A and intersection/ends/tip 220 to adjacent intersection/ends 184B and intersection/ends/tip 222. Peak or uppermost point 224 of edge 216 may be adjacent peak 106 of end housing sidewall 76.

With primary reference to FIG. 6, this paragraph describes some of the relationships between assembly 28A and end housing 22A. Left end 230 of flange 166 may be adjacent inner surface 84 of sidewall 76 along left portion 84C, and right end 232 of flange 166 may be adjacent inner surface 84 along right portion 84D. Ends 230 and 232 may be in the upper half of end housing 22A. Bases 242 and 244 may be about midway between left and right sides 110 and 112 of sidewall 76 and may be spaced downwardly from peak 106 and upwardly from base 108. Left end 248 of rib 168 may be adjacent inner surface 84 of sidewall 76 along left portion 84C, and right end 250 of rib 168 may be adjacent inner surface 84 along right portion 84D. Ends 248 and 250 may be in the upper half of end housing 22A. Rib 168 bottom edge 258 may be in its entirety closely adjacent or in contact with end housing inner surface 84 along left portion 84C, bottom portion 84B and right portion 84D from adjacent end 248 to adjacent end 250. Rib 168 top edge 256 base 260 and bottom edge 258 base 262 may be about midway between left and right sides 110 and 112 of sidewall 76. Bases 260 and 262 may be adjacent and upward of/directly above sidewall 76 base 108. Base 262 may be closely adjacent or in contact with sidewall 76 inner surface 84 along bottom portion 84B adjacent base 108.

Slide plate assembly 28A may be rigidly secured to end housing 22A sidewall 76 and hopper 26A by various welds which may include welds 266, 268, 270, 272 and 274. Weld 266 (FIG. 13) between assembly 28A plate 162 and hopper 26A sidewall 124 may extend continuously along the entire length of each of bottom rear edge segment 178 and top front edge segment 144 from adjacent intersection/ends 186A and left intersection/ends 148 to adjacent intersection/ends 186B and right intersection/ends 148. Weld 266 may be intersected by plane CL and thus may extend from the left portion or half of slide plate 162 and hopper sidewall 124 on the left side of plane CL to the right portion or half of slide plate 162 and hopper sidewall 124 on the right side of plane CL.

Left weld 268 (FIGS. 3, 13) between left edge segment 180 and inner surface 84 of housing 22A sidewall 76 may extend continuously along the entirety of segment 180 primarily along left side 70 and left portion 84C and along the left region of top portion 84A. Weld 268 may extend from adjacent intersection/ends 184A and intersection/ends/tip 220 to adjacent intersection/ends 186A and left intersection/ends 148. Weld 268 may be entirely to the left of or on the left side of plane CL and thus not intersected by plane CL. As viewed from the (left or right) side (FIG. 3), weld 268 may extend or curve continuously rearward and downward from adjacent intersection/ends 184A to adjacent intersection/ends 186A. As viewed from the rear (FIG. 13), weld 268 may be continuously curved from adjacent intersection/ends 184A to adjacent intersection/ends 186A so as to have a C-shaped configuration from adjacent end 184A to adjacent end 186A; and weld 268 may curve downward to the left from adjacent intersection/ends 184A to adjacent leftmost point 206 and may curve downward to the right from leftmost point 206 to intersection/ends 186A. As viewed from above (FIGS. 1, 19), weld 268 may be continuously curved from adjacent intersection/ends 184A to adjacent intersection/ends 186A. Left side section surface 201 of outer surface 174 may be adjacent left weld 268.

Right weld 270 (FIGS. 4, 13) between right edge segment 182 and inner surface 84 of housing 22A sidewall 76 may extend continuously along the entirety of segment 182 primarily along right side 72 and right portion 84D and along the right region of top portion 84A. Weld 270 may extend from adjacent intersection/ends 184B and intersection/ends/tip 222 to adjacent intersection/ends 186B and right intersection/ends 148. Weld 270 may be entirely to the right of or on the right side of plane CL and thus not intersected by plane CL. As viewed from the (left or right) side (FIG. 4), weld 270 may extend or curve continuously rearward and downward from adjacent intersection/ends 184B to adjacent intersection/ends 186B. As viewed from the rear (FIG. 13), weld 270 may be continuously curved from adjacent intersection/ends 184B to adjacent intersection/ends 186B so as to have a reverse C-shaped configuration from adjacent end 184B to adjacent end 186B; and weld 270 may curve downward to the right from adjacent intersection/ends 184B to adjacent rightmost point 208 and may curve downward to the left from rightmost point 208 to intersection/ends 186B. As viewed from above (FIGS. 1, 19), weld 270 may be continuously curved from adjacent intersection/ends 184B to adjacent intersection/ends 186B. Right side section surface 201 of outer surface 174 may be adjacent right weld 270.

Weld 272 (FIGS. 3, 4, 6, 13) between end plate top edge 216 and inner surface 84 of housing 22A sidewall 76 may extend continuously along the entirety of top edge 216 primarily or entirely along the top region of sidewall 76 and top portion 84A and may extend adjacent peak 106. Weld 272 may extend axially from adjacent intersection/ends 184A and intersection/ends/tip 220 to adjacent intersection/ends 184B and intersection/ends/tip 222. Weld 272 may be intersected by plane CL and thus may extend from the left portion or half of end plate 164 and sidewall 76 on the left side of plane CL and peak 106 to the right portion or half of end plate 164 and sidewall 76 on the right side of plane CL and peak 106. As viewed from the rear (FIG. 13), weld 272 may have an inverted U-shaped configuration from adjacent intersection/ends/tip 220 to adjacent intersection/ends/tip 222, and may curve continuously downward to the left from peak 224 to adjacent intersection/ends/tip 220 and intersection/ends 184A and downward to the right from peak 224 to adjacent intersection/ends 222 and intersection/ends 184B.

With primary reference to FIG. 6, weld 274 between rib 168 and inner surface 84 of housing 22A sidewall 76 may extend continuously along the entirety of bottom edge 258 along the bottom region of sidewall 76, bottom portion 84A and base 108 as well as along left side 110/left portion 84C and right side 112/right portion 84D. As viewed from the rear (FIG. 6) or front, weld 274 may have a U-shaped configuration from adjacent left end 248 to adjacent right end 250, may curve continuously upward to the left from adjacent base 262 and base 108 to adjacent the leftmost point of bottom edge 258 and upward to the right from the leftmost point bottom edge 258 to adjacent left end 248, and may curve continuously upward to the right from base 262 to adjacent the rightmost point of bottom edge 258 and upward to the left from the rightmost point bottom edge 258 to adjacent right end 250.

Assembly 28A slide plate 162 and end plate 164 may be secured to end housing 22A sidewall 76 and hopper 26A sidewall 124 via welds 266, 268, 270 and 272 as described above so as to provide an airtight interior chamber 20 which is separated from end housing chamber 24A by plates 162 and 164 so that chamber 20 may extend rearward of plates 162 and 164 and chamber 24A may extend forward of plates 162 and 164. Chamber 20 may be partially defined by slide plate 162 inner surface 172 and end plate 164 back surface 214. Chamber 24A may be partially defined by slide plate 162 outer surface 174 and end plate 164 front surface 212. Chamber 20 is defined primarily by the inner surface of top wall 54, the inner surfaces of hopper sidewalls 124, inner surfaces 172 of slide plates 162 and surfaces 214 of end plates 164, whereby each of these surfaces faces chamber 20.

Figure 14:
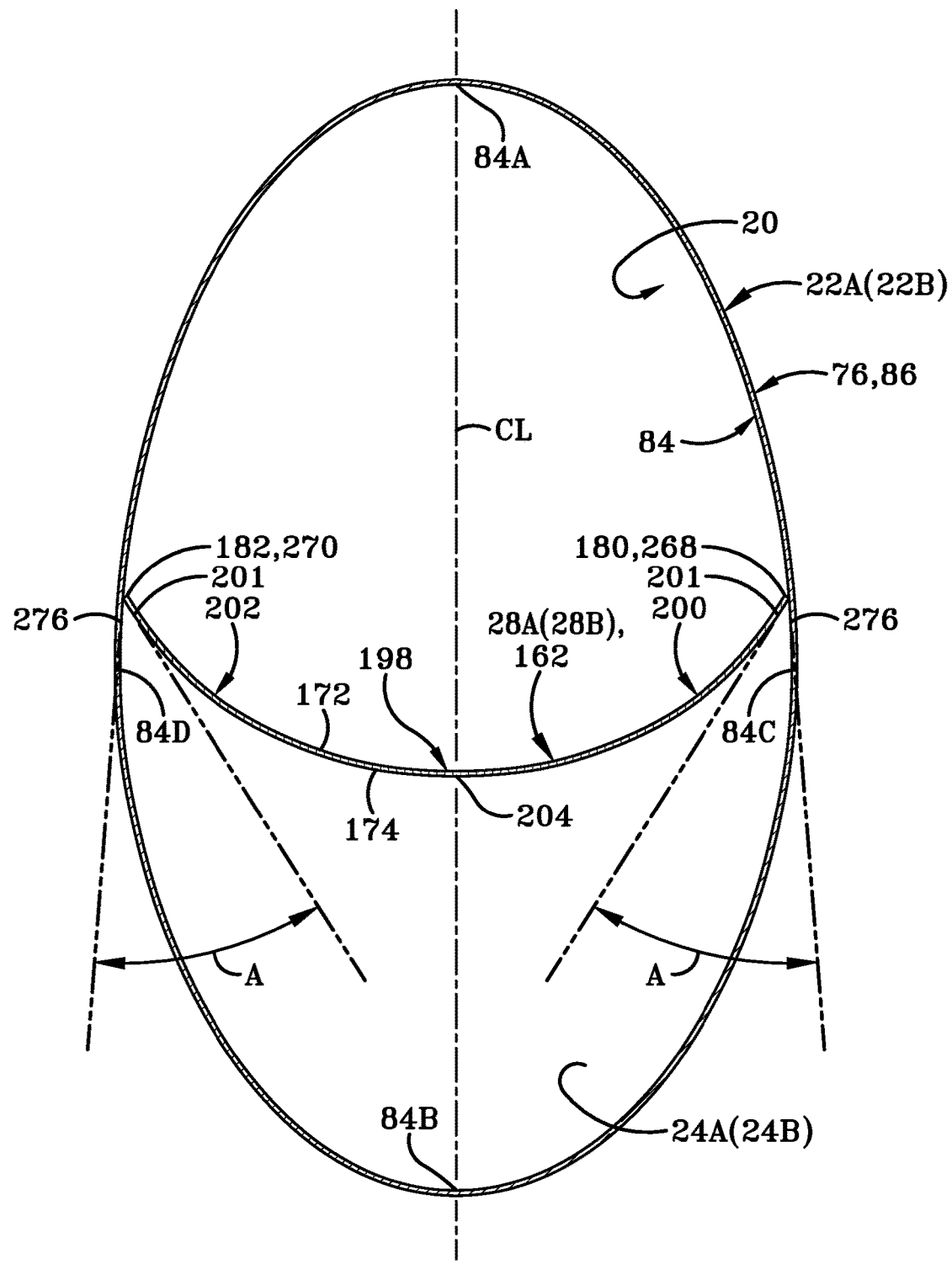
FIG. 14 is a sectional view taken on line 14-14 of FIG. 3, showing only the slide plate and end housing sidewall, as viewed along the slide plate in the same direction as FIG. 11.
Figure 15:
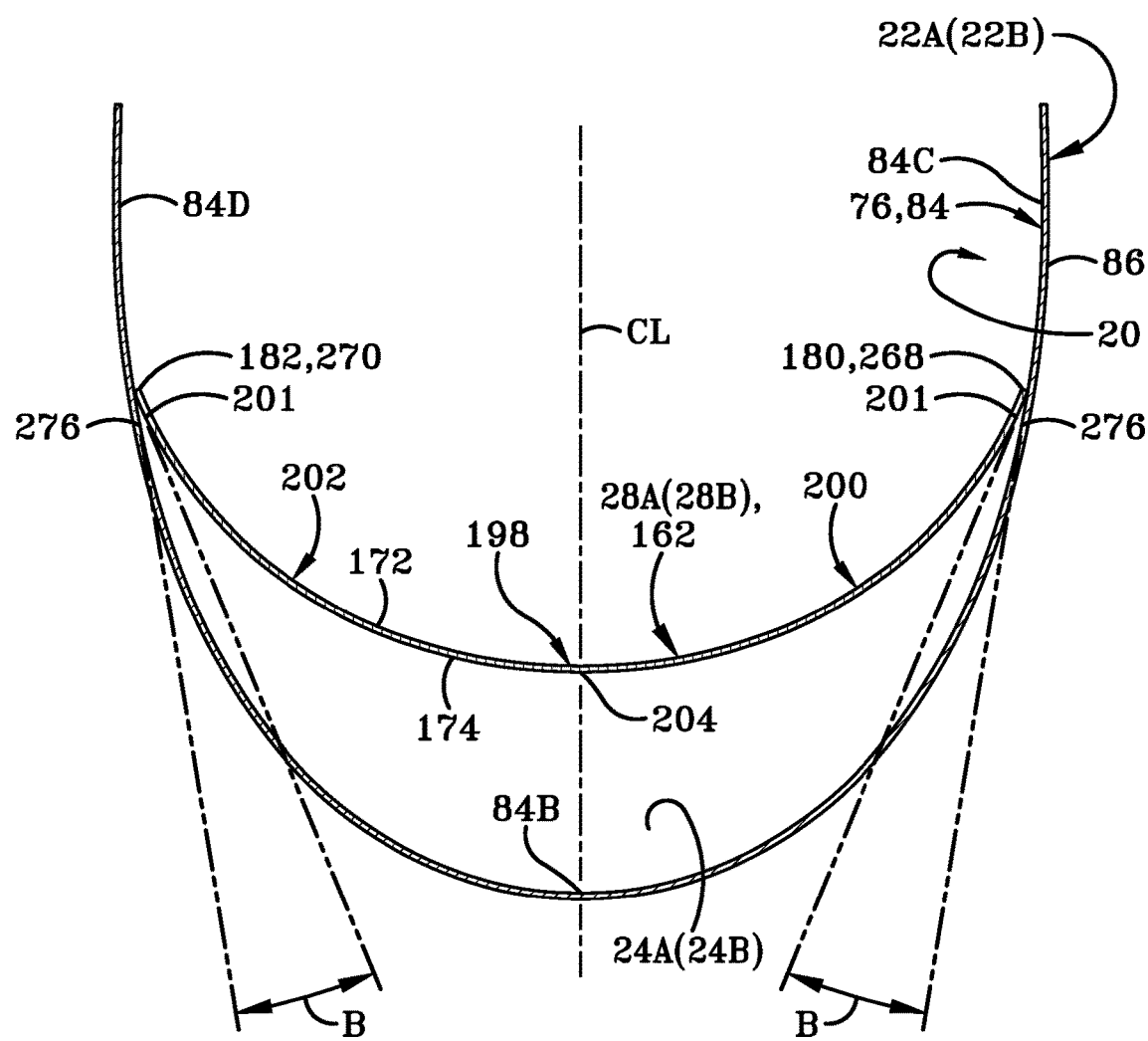
FIG. 15 is a sectional view taken on line 15-15 of FIG. 3, showing only the slide plate and end housing sidewall, as viewed along the slide plate in the same direction as FIG. 11.
Figure 16:
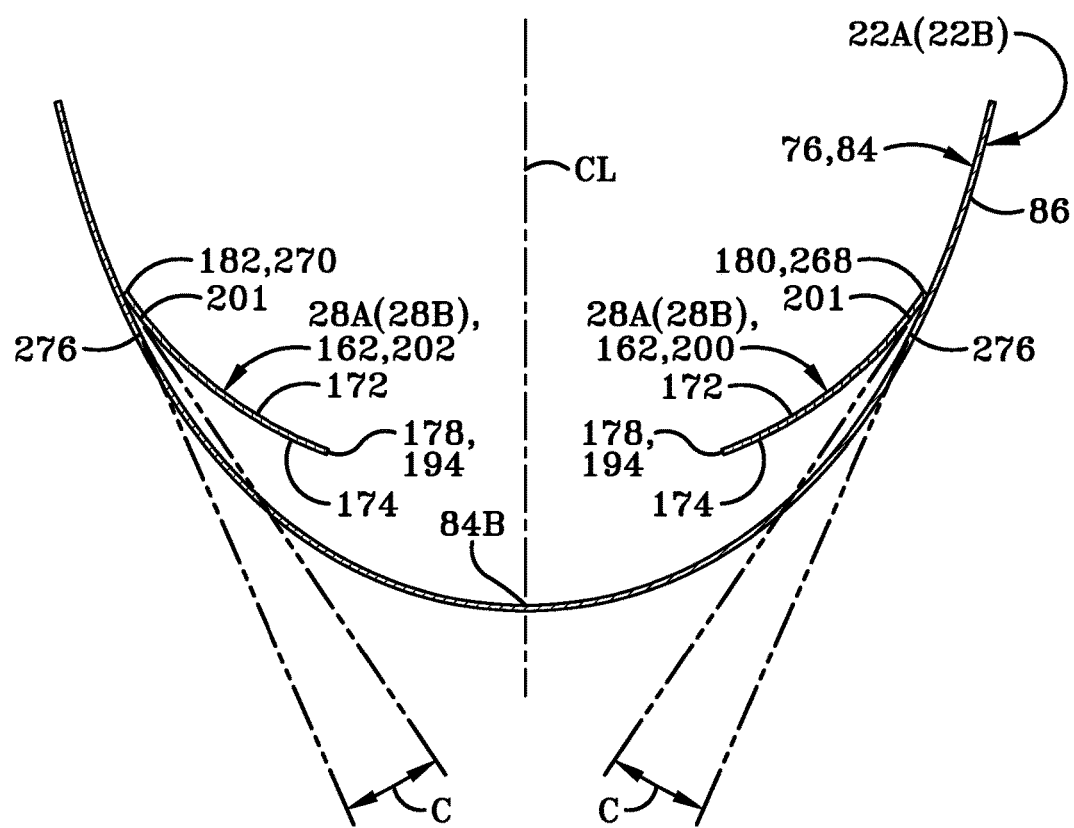
FIG. 16 is a sectional view taken on line 16-16 of FIG. 3, showing only the slide plate and end housing sidewall, as viewed along the slide plate in the same direction as FIG. 11.
Figure 17:
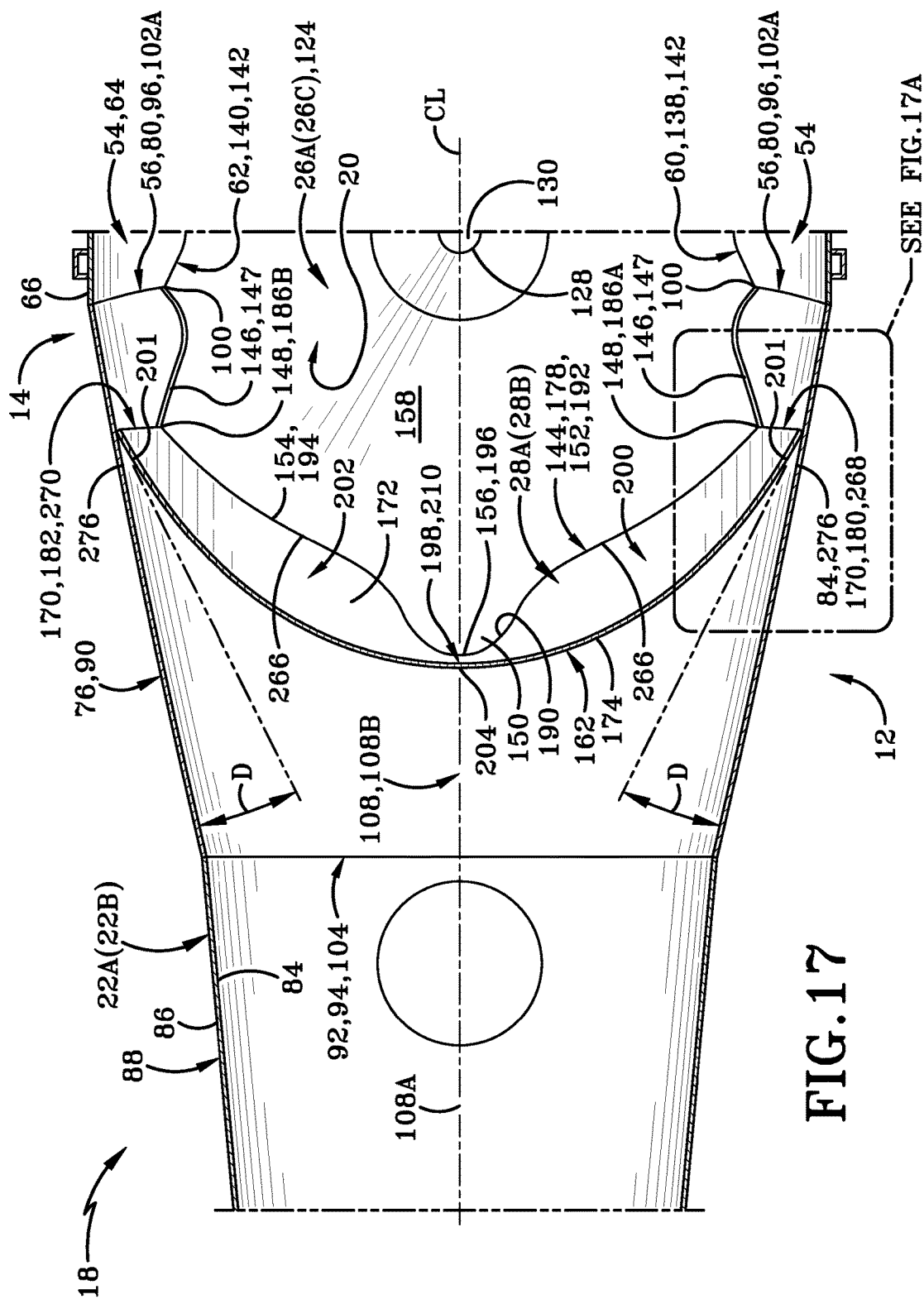
FIG. 17 is a sectional view taken on line 17-17 of FIG. 3.
Figure 17A:
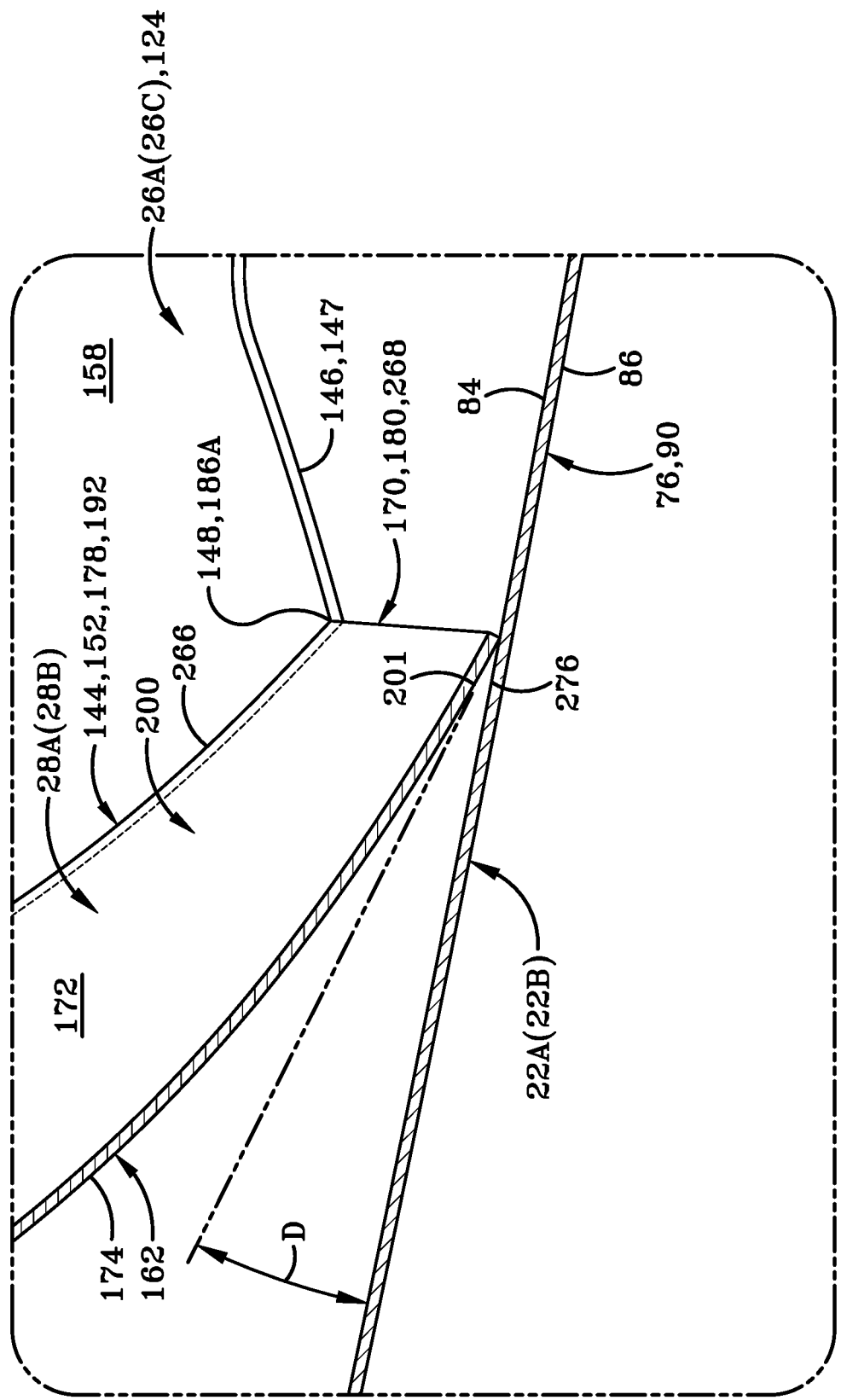
FIG. 17A is an enlarged view of the encircled portion of FIG. 17.
Figure 18:
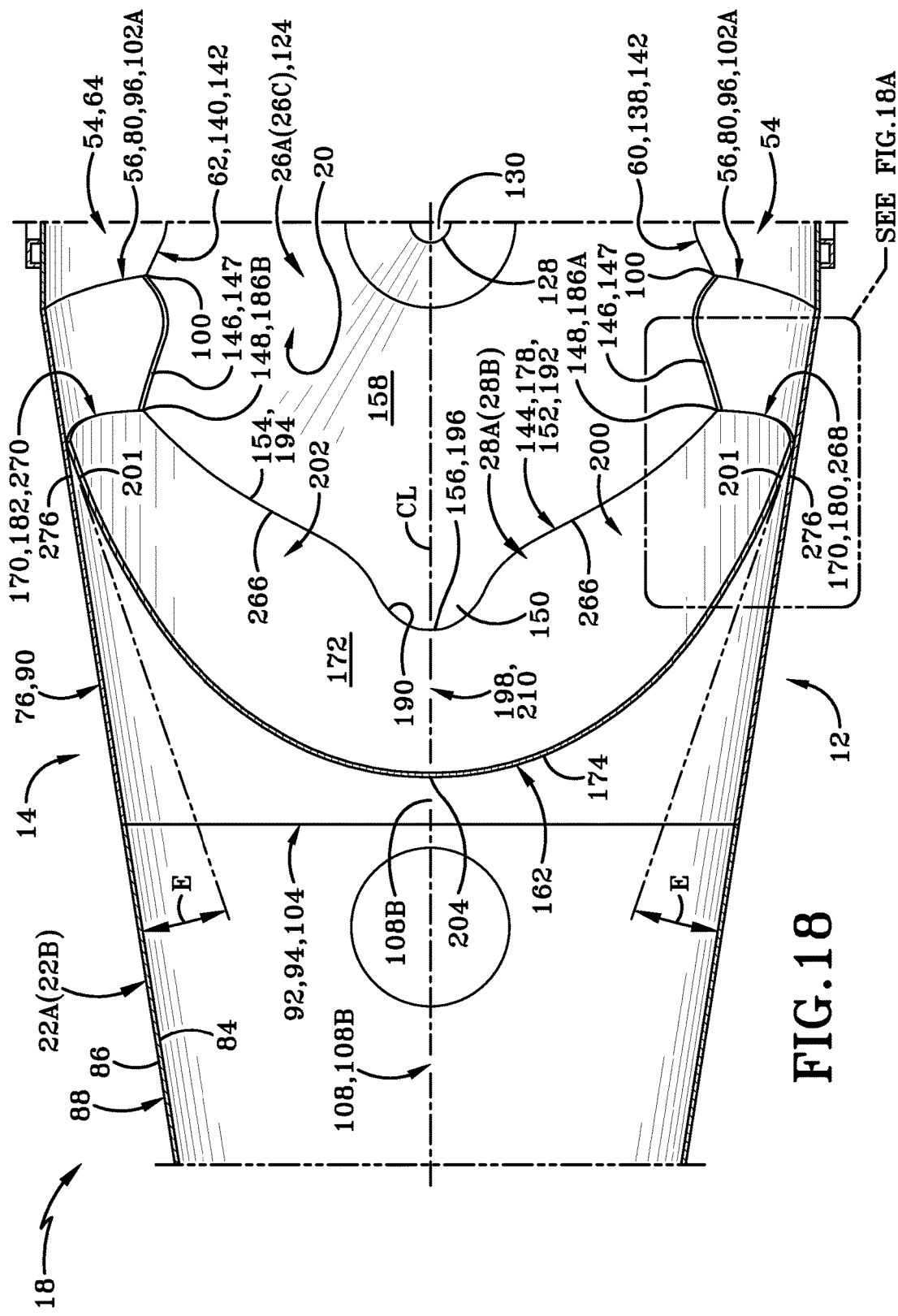
FIG. 18 is a sectional view taken on line 18-18 of FIG. 3.
Figure 18A:
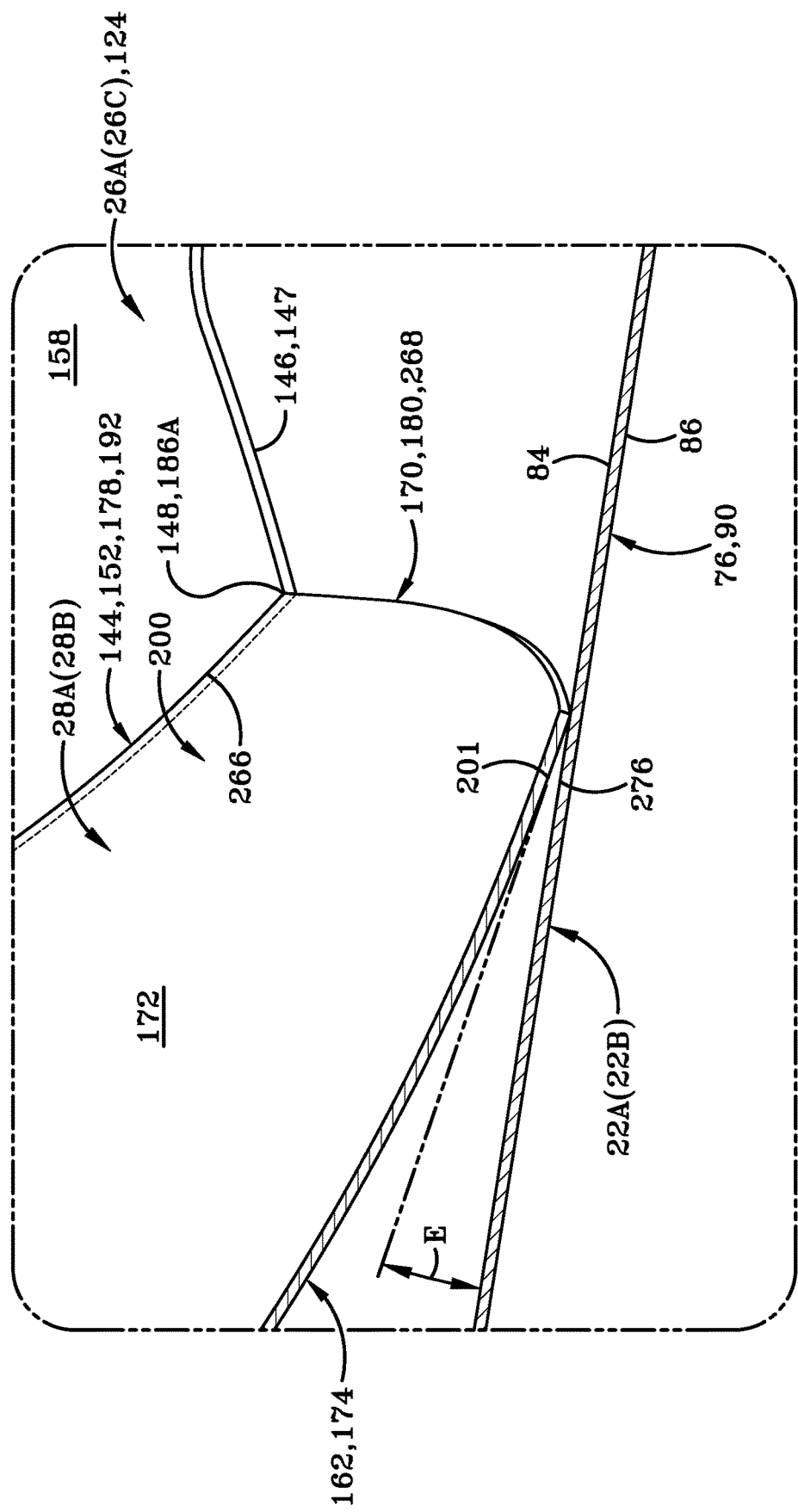
FIG. 18A is an enlarged view of the encircled portion of FIG. 18.
Figure 19:
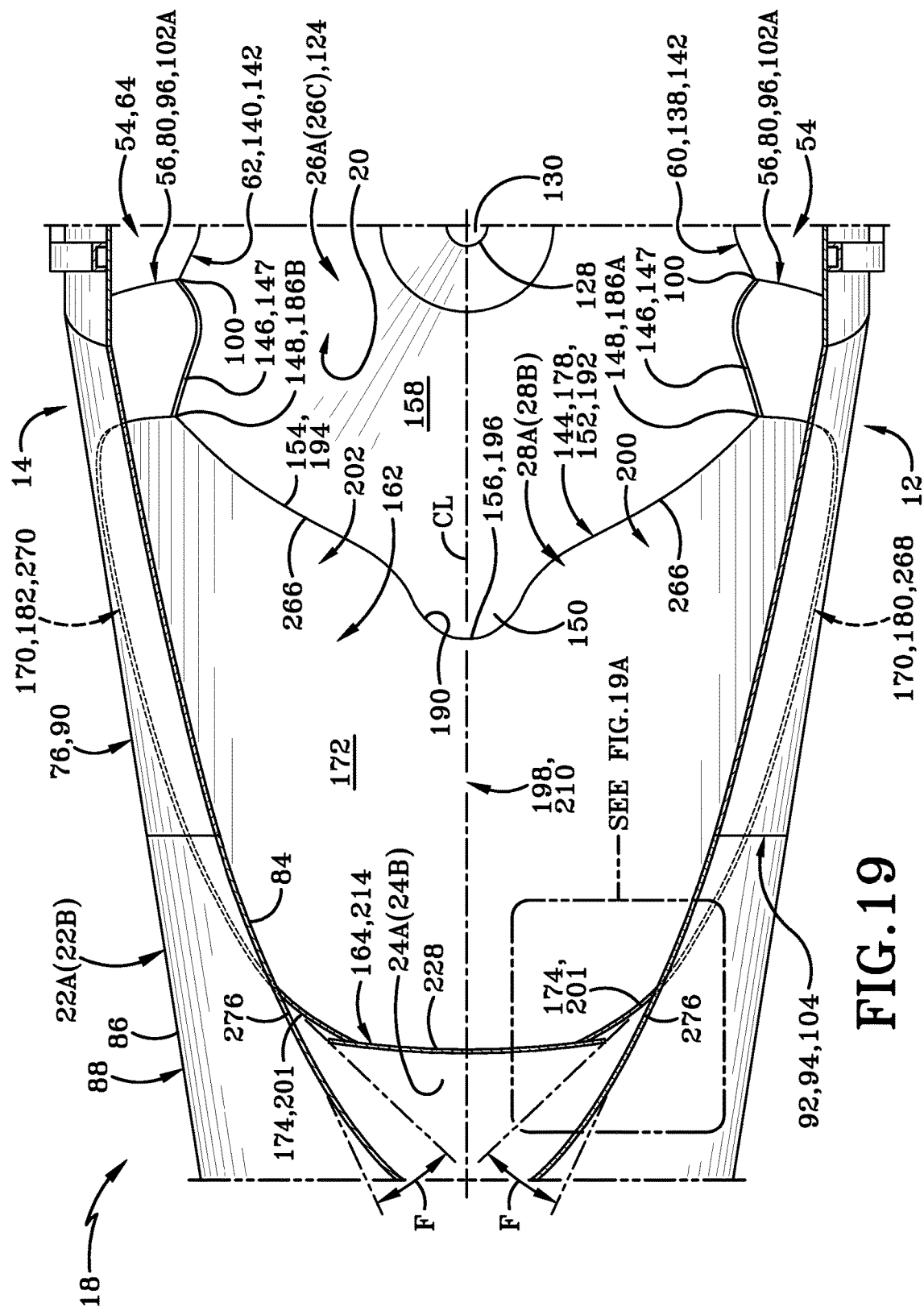
FIG. 19 is a sectional view taken on line 19-19 of FIG. 3.
Figure 19A:
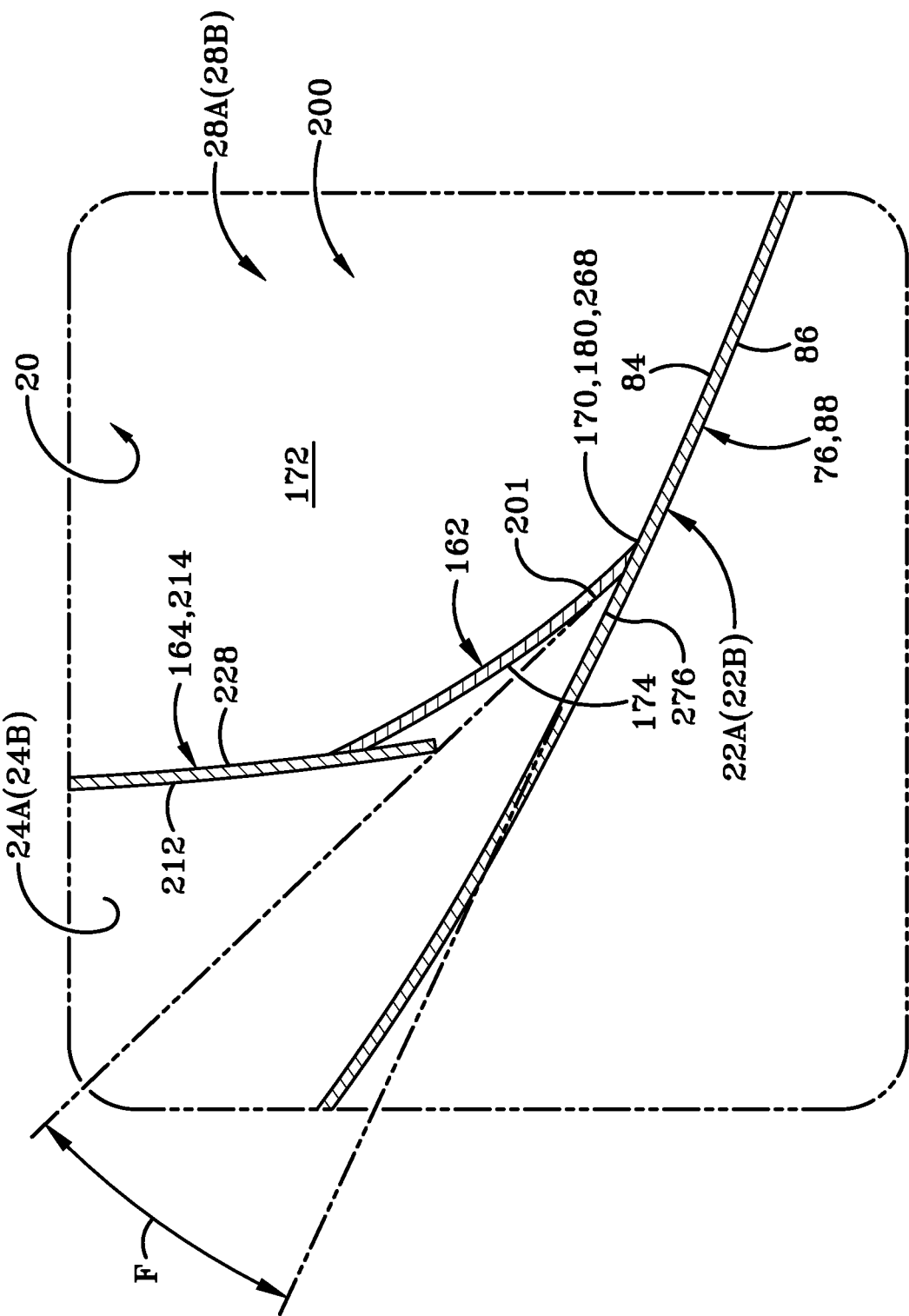
FIG. 19A is an enlarged view of the encircled portion of FIG. 19.

With primary reference to FIGS. 14-19, acute angles defined between assembly 28A slide plate 162 and end housing 22A sidewall 76 adjacent welds 180 and 182 are now discussed. FIGS. 14-16 show acute angles A, B and C, and FIGS. 17-19 show acute angles D, E and F. It may be that each of angles A, B and C is no greater than 40 or 45 degrees, that each of angles B and C is no greater than 35, 30, 25, 20, 15 or 10 degrees, and that angle A is greater than each of angles B and C. It may be that each of angles D, E and F is no greater than 45, 40, 35, 30 or 25 degrees, that each of angles D and E is no greater than 20 degrees, that angle E is no greater than 15 or 10 degrees, that angle F is greater than each of angles D and E, and that angle D is greater than angle E.

Each of FIGS. 14-16 with respect to assembly 28A is a sectional view looking downward and rearward along slide plate 162 in a direction which may be parallel to base 204 or arrow or line V1 (FIG. 1), as discussed further above. This paragraph discusses angles A-C as viewed in this downward and rearward viewing direction. FIGS. 14-16 show only slide plate 162 and sidewall 76 for clarity. Each of angles A, B and C is defined between a tangent of slide plate outer surface 174 and a tangent of sidewall inner surface 84 wherein the pair of tangents (shown in dashed lines) defining the given angle is either adjacent weld 268/side edge segment 180 or adjacent weld 270/side edge segment 182. More particularly, each of angles A, B and C may be defined between a tangent of slide plate outer surface 174 along left section/portion 200 adjacent left side edge segment 180 and adjacent weld 268 and a tangent of sidewall inner surface 84/left portion 84C adjacent left edge segment 180 and adjacent weld 268. End housing inner surface 84 may include a left end housing inner surface angle defining portion 276 which may be adjacent and below left edge segment 180 and weld 268. Each of angles A, B and C may be defined between a tangent of left side section surface 201 and a tangent of left angle defining portion 276. Each of angles A, B and C may also be defined between a tangent of slide plate outer surface 174 along right section/portion 202 adjacent right side edge segment 182 and adjacent weld 270 and a tangent of sidewall inner surface 84/right portion 84D adjacent right edge segment 182 and adjacent weld 270. End housing inner surface 84 may include a right end housing inner surface angle defining portion 276 which may be adjacent and below right edge segment 182 and weld 270. Each of angles A, B and C may be defined between a tangent of right side section surface 201 and a tangent of right angle defining portion 276. At the location of the given pair of tangents defining the given angle A, B or C, surfaces 174 and 84 are adjacent one another and face one another. At the given tangent of outer surface 174 defining a given angle A-C adjacent left edge segment 180 and weld 268, surface 174 may face axially outward to the left, downward and forward. At the given tangent of inner surface 84 defining a given angle A-C adjacent left edge segment 180 and weld 268, surface 84 may face axially inward to the right, rearward and upward (angles B and C) or downward (angle A). At the given tangent of outer surface 174 defining a given angle A-C adjacent right edge segment 182 and weld 270, surface 174 may face axially outward to the right, downward and forward. At the given tangent of inner surface 84 defining a given angle A-C adjacent right edge segment 182 and weld 270, surface 84 may face axially inward to the left, rearward and upward (angles B and C) or downward (angle A).

Angles A, B and C with respect to assembly 28A are thus analogous angles as viewed rearward and downward although at different longitudinal and/or vertical/height locations along slide plate 162 and sidewall 76. As can be seen from FIG. 3, the section of FIG. 14 and angle A is taken at a location which is forward of and higher than the sections of FIGS. 15 and 16 and angle B and C, and the section of FIG. 15 and angle B is taken a location which is forward of and higher than the section of FIG. 16 and angle C. The section of FIG. 14 and angle A is closer to slide plate 162 front upper end 176 and end plate 164 than are the sections of FIGS. 15 and 16 and angles B and C, and the section of FIG. 15 and angle B is closer to front upper end 176 and end plate 164 than is the section of FIG. 16 and angle C. The section of FIG. 14 and angle A is closer to front upper end/edge 176 and end plate 164 than to rear lower end/edge 178, intersections/ends 186A and 186B and hopper 26A sidewall 124 front edge segment 144. Each of the sections of FIGS. 15 and 16 and angles B and C is closer to rear lower end/edge 178, intersections/ends 186A and 186B and hopper 26A sidewall 124 front edge segment 144 than to front upper end 176 and end plate 164. The sections of FIGS. 14 and 15 and angles A and B are entirely forward of and higher than rear end/edge 178 and front edge 144, whereas the section of FIG. 16 cuts through edge segments 178 and 144 adjacent and forward of intersections/ends 186A and 186B.

Each of FIGS. 17-19 is a sectional view through assembly 28A slide plate 162 and end housing 22A sidewall 76 looking vertically downward taken along a respective horizontal plane, as shown in FIG. 3. Angles D-F are described as viewed in this vertical downward direction. Each of angles D, E and F is defined between a tangent of slide plate outer surface 174 and a tangent of sidewall inner surface 84 wherein the pair of tangents defining the given angle is either adjacent weld 268/edge segment 180 or adjacent weld 270/edge segment 182. The two tangents defining angle F are shown as dashed lines in FIG. 19, whereas only one of the tangents defining each of angles D and E is shown in dashed lines in FIGS. 18 and 19. The other tangent defining each of angles D and E is simply shown as the solid line which represents sidewall 76 inner surface 84 because this solid line is straight or nearly straight at the given location.

More particularly, each of angles D, E and F may be defined between a tangent of slide plate outer surface 174 along left section/portion 200 adjacent left side edge segment 180 and adjacent weld 268 and a tangent of sidewall inner surface 84/left portion 84C adjacent left edge segment 180 and adjacent weld 268. Each of angles D, E and F may be defined between a tangent of left side section surface 201 and a tangent of left angle defining portion 276. Each of angles D, E and F may also be defined between a tangent of slide plate outer surface 174 along right section/portion 202 adjacent right edge segment 182 and adjacent weld 270 and a tangent of sidewall inner surface 84/right portion 84D adjacent right side edge segment 182 and adjacent weld 270. Each of angles D, E and F may be defined between a tangent of right side section surface 201 and a tangent of right angle defining portion 276. At the location of the given pair of tangents defining the given angle D, E or F, surfaces 174 and 84 are adjacent one another and face one another.

At the given tangent of outer surface 174 defining a given angle D-F adjacent left edge segment 180 and weld 268, surface 174 may face axially outward to the left, downward and forward. At the given tangent of inner surface 84 defining a given angle D-F adjacent left edge segment 180 and weld 268, surface 84 may face axially inward to the right, rearward and upward (angle D) or downward (angles E and F). At the given tangent of outer surface 174 defining a given angle D-F adjacent right edge segment 182 and weld 270, surface 174 may face axially outward to the right, downward and forward. At the given tangent of inner surface 84 defining a given angle D-F adjacent right edge segment 182 and weld 270, surface 84 may face axially inward to the left, rearward and upward (angle D) or downward (angles E and F).

Angles D, E and F with respect to assembly 28A are thus analogous angles as viewed vertically downward or along a vertically downward viewing direction although at different longitudinal and/or vertical/height locations along slide plate 162 and sidewall 76. As can be seen from FIG. 3, the section of FIG. 17 and horizontal plane along which it is taken is lower than each of the sections of FIGS. 18 and 19 and the horizontal planes along which they are taken. The section of FIG. 18 and horizontal plane along which it is taken is lower than the section of FIG. 19 and the horizontal plane along which it is taken. The section of FIG. 17, the horizontal plane along which it is taken and angle D may be in the lower half of end housing 22A/sidewall 76. The sections of FIGS. 18 and 19, the horizontal planes along which they are taken and angles E and F may be in the upper half of end housing 22A/sidewall 76. The section of FIG. 17 and angle D is rearward of and lower than each of the sections of FIGS. 18 and 19 and angles E and F. The section of FIG. 18 and angle E is rearward of and lower than the section of FIG. 19 and angle F.

The section of FIG. 19 and angle F is closer to slide plate 162 front upper end 176 and end plate 164 (the section cuts through end plate 164) than are the sections of FIGS. 17 and 18 and angles D and E, and the section of FIG. 18 and angle E is closer to front upper end 176 and end plate 164 than is the section of FIG. 17 and angle D. The section of FIG. 19 and angle F is closer to front upper end/edge 176 and end plate 164 than to rear lower end/edge 178, intersections/ends 186A and 186B and hopper 26A sidewall 124 front edge segment 144. Each of angles D and E is closer to rear lower end/edge 178, intersections/ends 186A and 186B and hopper 26A sidewall 124 front edge segment 144 than to front upper end 176 and end plate 164. Each of the sections of FIGS. 17, 18 and 19 and angles D, E and F is entirely higher than rear end/edge 178 and front edge 144, and the section of FIG. 17 and angle D are adjacent and higher than edge segments 178 and 144 and intersections/ends 186A and 186B.

Various components (or relevant portions thereof) which are rearward of plane P will now be described, along with relevant aspects associated with such components. End housing 22B is now described with primary reference to FIGS. 3-7. Sidewall 76 may have a front end or edge 80 and a rear or back end or edge 82. Sidewall 76 may have inner and outer surfaces 84 and 86 each of which may extend from end 80 to end 82. Sidewall 76 may include a first or narrower section 88 and a second or wider section 90 which is rigidly secured to section 88 and extends forward therefrom. Each of sections 88 and 90 may have a frustoconical configuration. Section 88 may have a front end or edge 92, and section 90 may have a back end or edge 94 which is rigidly secured to end 92. End or edge 82 may also serve as the back end or edge of section 88, whereas front end or edge 80 may serve as the front end or edge of section 90. Front edge 80 may have an upper segment 96 and a lower segment 98 which intersect one another at two intersections 100. More particularly, upper edge segment 96 may have an inverted U-shaped configuration as viewed from the front (similar to the inverted U-shaped configuration of top wall 54 shown in FIG. 13 in section) so that upper segment 96 may have a right bottom end also represented by 100 in FIG. 3 and a left bottom end also represented by 100 in FIG. 4. Lower edge segment 98 may have a U-shaped configuration as viewed from the front or back, as shown in FIGS. 5 and 7. The right intersection 100 of FIG. 3 may also represent the right top front end of lower segment 98, while the left intersection 100 shown in FIG. 4 may represent left top front end of lower segment 98. Edge 80 as a whole as viewed from the front may have a generally circular or oval configuration and may be continuous so as to form a closed loop. Upper segment 96 may be straight as viewed from the side and may lie entirely along an upwardly extending plane which may extend axially across trailer 1 and be closely adjacent and parallel to the plane along which back edge 58 of top wall 54 lies, whereby these two planes may be nearly coplanar. Lower segment 98 may curve in a continuous fashion as viewed from the back or as viewed from below from the left intersection or end 100 to the right intersection or end 100. Lower segment 98 may curve concavely in a mating fashion with the convexly curved outer surface of the hopper 26C sidewall. End housing 22B/sidewall 76 may be rigidly secured to top wall 54 and hopper 26C by a weld 102. Weld 102 may include an upper weld segment 102A and a lower weld segment 102B which respectively secure top wall 54 and hopper 26C to end housing 22B sidewall 76. Weld 102 may be a continuous weld along the entirety of front edge 80 and thus have a configuration similar to that of front edge 80. Thus, weld 102 as viewed from the front or back may be generally circular or oval or have a closed loop configuration. As viewed from the front or back, upper weld segment 102A may likewise have the same type of inverted U-shaped configuration as upper segment 96, whereas lower weld segment 102B may have a U-shaped configuration as viewed from the front or back which is essentially the same as that of lower segment 98. Upper weld 102A as viewed from the side may be straight and may lie along a plane which may extend axially across trailer 1 and be closely adjacent and parallel to or coplanar with the two planes along which back edge 58 and upper segment 96 respectively lie. Lower weld 102B may be continuously curved as viewed from the bottom and as viewed from the side from adjacent left intersection/ends 100 to adjacent right intersection/ends 100.

Referring to FIGS. 5-7, sidewall 76 including sections 88 and 90 in cross section (as viewed from the front or rear) may have a circular, oval or other closed loop configuration. Similarly, ends or edges 92, 94 and 82 may have a circular, oval or other closed loop configuration as viewed from the front or back. Section 88 may be rigidly secured to section 90 by a weld 104 (FIGS. 3-4) extending along edges 92 and 94. More particularly, weld 104 may be a continuous weld which extends along the entirety of edges 92 and 94 and which may as viewed from the front or rear have a circular, oval or other closed loop configuration. Edges 92 and 94 and weld 104 may be straight and essentially vertical as viewed from the side and may each lie entirely along a respective axially extending plane which cuts across the trailer and end housing such that the three planes may be closely adjacent and parallel to one another and/or coplanar. Said planes may also be essentially vertical, parallel to plane P and perpendicular to plane CL. End housing 22B/sidewall 76 may have a longitudinally elongated peak 106 at the intersection of center plane CL and outer surface 86 along the top of sidewall 76. Peak 106 may extend from adjacent the top of front edge 80 to adjacent the top of back edge 82. Housing 22B and sidewall 76 may also have a longitudinally elongated base 108 (which may include bases or base segments 108A and 108B respectively of sections 88 and 90) at the intersection of center plane CL and outer surface 86 along the bottom of sidewall 76. Base 108 may extend from adjacent the bottom of front edge 80 to adjacent the bottom of back edge 82 and lower edge segment 98. Sidewall 76 may have first and second sides 110 and 112 which may respectively serve as right and left sides of the sidewall and end housing 22B. Each of sides 110 and 112 may be longitudinally elongated from front edge 80 to back edge 82.

This paragraph provides a description as viewed from above (FIG. 2). End housing 22B and sidewalls 76 may taper from front end or edge 80 to back end or edge 82 so as to become increasingly narrower from front to back. Each of sections 88 and 90 may likewise taper to become narrower from the front to the back of the respective section. Right side 110 may taper or angle rearward to the left from adjacent front edge 80 to adjacent back edge 82. Left side 112 may taper or angle rearward to the right from adjacent front edge 80 to adjacent back edge 82. Sidewall 76 may be axially wider (from left to right perpendicular to plane CL) at or adjacent front end 80 than at ends 92, 94 and 82, and sidewall 76 at ends 92 and 94 may be axially wider than at or adjacent back end 82.

This paragraph provides a description as viewed from the side (FIGS. 3-4). End housing 22B and sidewall 76 may taper from adjacent front end 80 to adjacent back end 82 so as to narrow from front to back. Wider section 90 may also narrow or taper from front edge 80 to back edge 94, and narrower section 88 may taper or narrow from front edge 92 to back edge 82. Thus, housing 22B and sidewall 76 may be vertically wider at or adjacent front end 80 than at ends or edges 92, 94 and 82. Housing 22B and sidewall 76 may also be vertically wider adjacent ends 92 and 94 than adjacent end 82. Peak 106 may angle or taper downward and rearward from adjacent front end 80 to adjacent ends 92, 94 and 82. Peak 106 may likewise taper or angle downward and rearward from adjacent ends 92 and 94 to adjacent end 82. Peak 106 may angle downward and rearward along a straight line at a constant angle from adjacent front end 80 to adjacent back end 82. Base segment 108B may angle or taper upward and rearward from adjacent front edge 80 and edge segment 98 to adjacent edges 92 and 94. Base or base segment 108A may extend rearward from base segment 108B along a different angle, for instance such that base segments 108A and 108B may define therebetween an obtuse angle below segments 108A and 108B. Base segment 108A may be essentially horizontal as viewed from the side from front end 92 to back end 82.

As viewed from the front or rear, such as shown in FIGS. 5-7, inner surface 84 of sidewall 76 may be concavely curved in its entirety whereas outer surface 86 may be convexly curved in its entirety. Inner surface 84 may have a downwardly facing top portion 84A extending along the top portion of sidewall 76 and peak 106, an upwardly facing bottom portion 84B extending along the bottom portion of sidewall 76 and base 108, a leftward facing right portion or right side portion 84C extending along the right portion of sidewall 76 right side 110, and a rightward facing left portion or left side portion 84D extending along the left portion of sidewall 76 and left side 112. As viewed from the front (FIG. 6), top portion 84A may be continuously concavely curved or have an inverted U-shaped configuration along, for instance, at least a top quarter, top third or top half of sidewall 76 and inner surface 84; bottom portion 84B may be continuously concavely curved or have a U-shaped configuration along, for instance, at least a bottom quarter, bottom third or bottom half of sidewall 76 and inner surface 84; right portion 84C may be continuously concavely curved or have a C-shaped configuration along, for instance, at least a right quarter, right third right half of sidewall 76 and inner surface 84; left portion 84D may be continuously concavely curved or have a reverse C-shaped configuration along, for instance, at least a left quarter, left third or left half of sidewall 76 and inner surface 84.

With primary reference to FIGS. 3, 4 and 6, cap wall 78 is now described. As viewed from the front or rear, cap wall may, for instance, have a circular or oval configuration. Cap wall 78 may have front and back ends 114 and 116, and inner and outer surfaces 118 and 120. Front end 114 may be an edge which has essentially the same size and shape as edge 82 of sidewall 76 although edge 114 may face forward while back edge 82 faces rearward. Thus, edge 114 as viewed from the rear may have a circular, oval or other closed loop configuration. Edges 82 and 114 may be straight and vertical as viewed from the side and may lie in respective planes which cut axially across trailer 1 and sidewall 76 and which may be closely adjacent and parallel to one another or nearly coplanar. Said planes may be vertical, parallel to plane P and perpendicular to plane CL. Cap wall 78 may be secured to sidewall 76 by a weld 122 between/along edges 82 and 114. Weld 122 may be a continuous weld extending along the entirety of edges 82 and 114 such that weld 122 may have a circular, oval or other closed loop configuration as viewed from the front or rear. Weld 122 may also be straight and vertical as viewed from the side and lie entirely along a straight and vertical plane which may be parallel and closely adjacent to and/or coplanar with the planes along which edges 82 and 114 lie. Inner or front surface 118 may face forward and may be partially or entirely concavely curved as viewed from the side and/or above. Outer or back surface 120 may face rearward and be partially or entirely convexly curved as viewed from the side and/or above. Surface 120 may define the back of cap wall 78, end housing 22B and bulk tank assembly 16.

Each of left edge segments 138 and 140 may have a rearward edge portion 146 shown in FIGS. 3, 4, 13 and 17. The left rearward edge portion 146 of left segment 138 may extend rearward from adjacent the rear left intersection 100, the left bottom end (also 100) of upper segment 96 along left section 70, and the left top front end (also 100) of lower segment 98 along left section 70 to a rear left intersection 148 between the back end of left edge segment 138 and the left end of back edge segment 144. The right rearward edge portion 146 of right segment 140 may extend rearward from adjacent the rear right intersection 100, the right bottom end (also 100) of upper segment 96 along right section 72, and the right top front end (also 100) of lower segment 98 along right section 72 to a rear right intersection 148 between the back end of right edge segment 140 and the right end of back edge segment 144. The left rearward edge portion 146 of left segment 138 may be secured to inner surface 84 of end housing 22B sidewall 84 by a weld 147 (FIGS. 4, 13, 17) which may extend along left portion 84D and the entirety of said left portion 146. The right rearward edge portion 146 of right segment 140 may be secured to inner surface 84 of end housing 22B sidewall 84 by an analogous weld 147 (FIGS. 13, 17) which may extend along right portion 84C and the entirety of said right portion 146. Sidewall 124 of back hopper 26C may have a rear tongue 150 which projects upwardly and rearward beyond the left and right portions of the back half of sidewall 124. Thus, back edge segment 144 may have first and second side portions (here right and left side portions) 152 and 154 and a central portion 156 therebetween which extends rearward and upward of portions 152 and 154.

With primary reference to FIGS. 8-12, rear slide plate assembly 28B may include a slide plate 162, an end plate 164, a support flange 166 and a rib 168 which may all be rigidly secured together as a rigid unit and which may be rigidly secured to hopper 26C sidewall 124 and end housing 22B sidewall 76 and extend within sidewall 76 and housing 22B (FIGS. 1-4). Each of slide plate 162, end plate 164, flange 166 and rib 168 may be formed an aluminum alloy or other suitable metal. Slide plate assembly 28B may be entirely within housing 22B. Slide plate 162 may have an outer perimeter edge 170 which extends all the way around the outer perimeter of plate 162 in a continuous manner to form a closed loop configuration. Plate 162 may have an inner surface 172 and an outer surface 174 which face away from one another and which each extend continuously along plate 162 within outer perimeter edge 170. Outer perimeter edge 170 may have a back edge segment or portion 176, a front edge segment or portion 178, a first or right side edge segment or portion 180 and a second or left side edge segment or portion 182. Each of inner and outer surfaces 172 and 174 may extend continuously from front segment 176 to rear segment 178 and from right segment 180 to left segment 182. The rear upper end of right segment 180 may intersect the right end of rear segment 176 at a rear upper right intersection 184A. Numeral 184A may also represent the back end of segment 180 and the right end of segment 176. Similarly, the rear upper end of left segment 182 and the left end of segment 176 may intersect one another at a rear upper left intersection 184B. Numeral 184B may also represent the rear upper end of segment 182 and the left end of segment 176. The front lower end of right segment 180 and the right end of front segment 178 may intersect at a right lower front intersection 186A. Numeral 186A may also represent the front lower end of segment 180 and the right end of segment 178. The front lower end of left segment 182 and the left end of front segment 178 may intersect at a left lower front intersection 186B. Numeral 186B may also represent the front end of segment 182 and the left end of segment 178. Right side edge segment 180/slide plate 162 may have a rightmost point 206, and left side edge 182/slide plate 162 may have a leftmost point 208. Points 206 and 208 may be longitudinally adjacent and rearward of intersections/ends 186A and 186B and longitudinally distal and forward of back edge 176/intersections/ends 184A and 184B/end plate 164, as may be understood as viewed from above as in FIG. 10.

As viewed from the front (FIG. 13), right edge segment 180 may be continuously curved from adjacent its rear upper end 184A to adjacent its front lower end 186A so as to have a C-shaped configuration from adjacent end 184A to adjacent end 186A; right edge segment 180 may curve downward to the right from adjacent rear upper end 184A to adjacent rightmost point 206 and may curve downward to the left from rightmost point 206 to front lower end 186A; left edge segment 182 may be continuously curved from adjacent its rear upper end 184B to adjacent its front lower end 186B so as to have a reverse C-shaped configuration from adjacent end 184B to adjacent end 186B; left edge segment 182 may curve downward to the left from adjacent rear upper end 184B to adjacent leftmost point 208 and may curve downward to the right from leftmost point 208 to front lower end 186B.

Front edge 178 may define a hopper sidewall receiving space 188 including a narrower tongue-receiving cutout 190. Front edge segment 178 may include a first or right side portion 192, a second or left side portion 194 and a central portion 196 therebetween. Right side portion 192 may extend from right end 186A of segment 178 to the right side of central portion 196, whereas left side portion 194 may extend from left end 186B of segment 178 to the left side of central portion 196. Central portion 196 may define cutout 190. Slide plate 162 may include a central section or portion 198, a right section or portion 200 and a left section or portion 202. Slide plate outer surface 174 along each of side sections 200 and 202 may include a side section surface 201 respectively adjacent side edge segments 180 and 182. Central section 198 may define back edge segment 176, central portion 196, and portions of right and left side portions 192 and 194. Right side section 200 may define the entirety of right edge segment 180 and part or all of right side portion 192. Left side section 202 may define the entirety of left edge segment 182 and part or all of left side portion 194. The front portion of right side section 200 and the front portion of left side section 202 may define therebetween space 188 and cutout 190. Plate 162 may have a longitudinally elongated base 204 which may extend from back end or edge 176 to front end or edge 178 and may be defined by an intersection between central plane CL and outer surface 174 of plate 162. Base 204 may extend from the center of back edge 176 midway between ends 184A and 184B to the center of front edge 178 and section 196 midway between ends 186A and 186B. Base 204 may be a straight line and angle downward and forward from adjacent back edge 176 to adjacent front edge 178/portion 196. Plate 162 may generally be at an angle such that inner surface 172 faces upward and forward and outer surface 174 faces rearward and downward.

This paragraph discusses slide plate 162 of assembly 28B as viewed in a downward and forward direction such as shown in FIG. 11. This downward and forward direction may be along base 204 from back edge segment 176 to front edge segment 178. This downward and forward direction may also be along a line V2 (FIG. 1) which may be parallel or essentially parallel to base 204 and generally from the top rear end of plate 162 toward the bottom front end of plate 162. Line V2 may lie in plane CL or a plane parallel to plane CL. This downward and forward direction may be at about a 45-degree angle (for instance, plus or minus 5 or 10 degrees) to horizontal as viewed from the side of assembly 28B/trailer 1. Slide plate 162 of assembly 28B may have a U-shaped configuration which may extend from the right edge segment 180 to the left edge segment 182 or from rightmost point or portion 206 of plate 162 to leftmost point or portion 208 of plate 162. Inner surface 172 may in its entirety be continuously concavely curved. Thus, inner surface 172 of any or all of sections 198, 200 and 202 may be entirely continuously concavely curved. Inner surface 172 may be continuously concavely curved from a first given point on or adjacent surface 172 to any other second given point on or adjacent surface 172 which is axially offset from the first given point, that is, to the left or right of the first given point. For instance, surface 172 may be continuously concavely curved from any of the following components or locations to any other of the following components or locations which is axially offset therefrom: rightmost point 206, leftmost point 208, right side edge segment 180, left side edge segment 182, right rear intersection 184A (or right end 184A of back edge segment 176 or the right rear upper end 184A of right side edge segment 180), left rear intersection 184B (or left end 184B of back edge segment 176 or the left rear upper end 184B of left edge segment 182), an axial center 210 of plate 162/surface 172 midway between the rightmost and leftmost points 206 and 208, the intersection between center plane CL and inner surface 172, and so forth. Outer surface 174 may be continuously convexly curved in a similar manner between the same or analogous axially offset components or locations.

With primary reference to FIGS. 8-10 and 12, end plate 164 of assembly 28B is now described. End plate 164 may be generally flat and vertical although it may be slightly curved as viewed from above (FIG. 10). End plate 164 may have a rearward facing rear surface 212, a forward facing front surface 214, an upward facing top edge 216 and a downward facing bottom edge 218. Top and bottom edges 216 and 218 at respective left ends thereof may intersect one another at a left intersection or leftward pointing tip 222 which may be V-shaped as viewed from the front or rear. Top and bottom edges 216 and 218 at respective right ends thereof may intersect one another at a right intersection or rightward pointing tip 220 which may be V-shaped as viewed from the front or rear. Top edge 216 may have an uppermost point or peak 224 which may be axially midway between right and left ends 220 and 222 of edge 216 or midway between intersections 220 and 222 and/or at the intersection of top edge 216 and plane CL. Bottom edge 218 may have a lowermost point or base 226 which may be axially midway between right and left ends 220 and 222 of edge 218 or midway between intersections 220 and 222 and/or at the intersection of bottom edge 218 and plane CL. Back and front surfaces 212 and 214 may be flat or nearly flat or planar and essentially vertical. As viewed from above, back surface 212 may be slightly convexly curved and front surface 214 may be slightly concavely curved. In cross section taken at plane CL and/or at peak 224 and base 226, plate 164 and surfaces 212 and 214 may be straight and vertical, as shown in FIG. 4. As viewed from the rear (FIG. 9) or front, top edge 216 may have an inverted U-shaped configuration and/or be continuously convexly curved from adjacent right end or tip 220 to adjacent left end or tip 222, and bottom edge 218 may have a U-shaped configuration and/or be continuously convexly curved from adjacent right end or tip 220 to adjacent left end or tip 222. Top edge 216 may curve continuously downward to the right from peak 224 to right end/intersection 220 and downward to the left from peak 224 to left end/intersection 222. Bottom edge 218 may curve continuously upward to the right from base 226 to right end/intersection 220 and upward to the left from base 226 to left end/intersection 222. Plate 164 and back surface 212 may have a football shape or eye shape as viewed from the rear. Similarly, front surface 214 may have a football shape or eye shape as viewed from the front.

Front surface 214 along bottom edge 218 may be closely adjacent or in contact with back edge segment 176 along the entirety of segment 176 from adjacent right end 184A to adjacent left end 184B. End plate 164 may be rigidly secured to slide plate 162 by a weld 228 (FIGS. 10, 12) between plates 162 and 164 adjacent back edge segment 176 of slide plate 162 and front surface 214 of end plate 164. Weld 228 may extend continuously along the entirety of rear edge segment 176 from adjacent right end 184A to adjacent left end 184B and along bottom edge 218 from adjacent right end or tip 220 to adjacent left end or tip 222. Weld 228 may have U-shaped configuration as viewed from the front (FIG. 12). Plate 164 may extend upwardly of plate 162/inner surface 172 adjacent back edge segment 176. Plate 164 may extend from adjacent the back end 184A of right edge segment 180 to adjacent the back end 184B of left edge segment 182. Right and left ends/intersections/tips 220 and 222 may be respectively adjacent right and left ends/intersections 184A and 184B. Right end/tip/intersection 220 may be axially inward of, inboard of or spaced to the left of right end/intersection 186A and rightmost point 206, and left end/tip/intersection 222 may be axially inward of, inboard of or spaced to the right of left end/intersection 186B and leftmost point 208. Base 226 of bottom edge 218 may be adjacent base 204 of outer surface 174/plate 162 adjacent back end 176.

With primary reference to FIGS. 4-6, 8 and 9, support flange 166 of assembly 28B is now described. Flange 166 may have right and left ends 230 and 232 between which flange 166 is axially elongated. Flange 166 may be U-shaped from adjacent end 230 to adjacent end 232 as viewed from the rear (FIG. 9). Flange 166 may have a rearward facing back surface 234, a forward facing front surface 236, an upward facing top edge 238 and a downward facing bottom edge 240 each of which extends from adjacent end 230 to adjacent end 232. Flange 166 and surfaces 234 and 236 may be essentially flat and vertical (as shown in section from the side in FIG. 4) and may lie entirely along respective vertical axially extending planes which may be adjacent and parallel to one another, parallel to plane P and perpendicular to plane CL. Top edge 238 may have a lowermost point or base 242 which may be axially midway between right and left ends 230 and 232 and/or at the intersection of top edge 238 and plane CL. Bottom edge 240 may have a lowermost point or base 244 which may be axially midway between right and left ends 230 and 232 and/or at the intersection of bottom edge 240 and plane CL. As viewed from the rear (FIG. 9), top edge 238 may have a U-shaped configuration and/or be continuously concavely curved from adjacent right end 230 to adjacent left end 232, bottom edge 240 may have a U-shaped configuration and/or be continuously convexly curved from adjacent right end 230 to adjacent left end 232, and back surface 234 may have a U-shaped configuration from adjacent right end 230 to adjacent left end 232. Top edge 238 may curve continuously upward to the left from base 242 to adjacent left end 232 and upward to the right from base 242 to adjacent right end 230. Bottom edge 240 may curve continuously upward to the left from base 244 to adjacent left end 232 and upward to the right from base 244 to adjacent right end 230. Front and rear surfaces 234 and 236 may curve continuously upward to the left from adjacent bases 242 and 244 to adjacent left end 232 and upward to the right from adjacent bases 242 and 244 to adjacent right end 230.

Right and left ends 230 and 232 of flange 166 may be respectively adjacent right and right edge segments 180 and 182 of plate 162 so that flange 166 may extend from adjacent right edge segment 180 to adjacent left edge segment 182. Top edge 238 may be closely adjacent or in contact with plate 162 outer surface 174 along the entirety of top edge 238 from adjacent end 230 to adjacent end 232 and from adjacent edge segment 180 to adjacent edge segment 182 of plate 162. Slide plate 162/outer surface 174 may be seated on top edge 238. Base 242 of top edge 238 may be closely adjacent or in contact with plate 162 base 204. Flange 166 may be rigidly secured to slide plate 162 by a weld 246 (FIGS. 4, 5, 8, 9) between plate 162 and flange 166 along top edge 238 and outer surface 174. Weld 246 may extend continuously along the entirety of top edge 238 from adjacent end 230 to adjacent end 232 and from adjacent edge segment 180 to adjacent edge segment 182 of plate 162. Weld 246 may have U-shaped configuration as viewed from the rear (FIG. 9). Flange 166 may be directly below plate 162 and may extend downward from adjacent outer surface 174 and top edge 238 to bottom edge 240. Flange 166 in its entirety may be spaced forward of and lower than end plate 164 in its entirety. Thus, ends 230 and 232, edges 238 and 240, and surfaces 234 and 236 may be forward of and lower than surfaces 212 and 214, edges 216 and 218, and tips 220 and 222. Left end 232 may be axially outward of, outboard of or spaced to the left of left end/tip/intersection 222, and right end 230 may be axially outward of, outboard of or spaced to the right of right end/tip/intersection 220. Flange 166 in its entirety may be spaced rearward of and higher than front lower end/edge 178 of plate 162. Thus, ends 230 and 232, edges 238 and 240, and surfaces 234 and 236 may be rearward of and higher than edge 178 including segments 152, 154 and 156, ends/intersections 186A and 186B and space 188/cutout 190. Left end 232 may be axially inward of, inboard of or spaced to the right of left end/intersection 186B and leftmost point 208, and right end 230 may be axially inward of, inboard of or spaced to the left of right end/intersection 186A and rightmost point 206.

With primary reference to FIGS. 4, 6, 8 and 9, arcuate rib 168 of assembly 28B is now described. Rib 168 may have right and left top or upper ends 248 and 250 between which rib 168 may be axially and vertically elongated. Rib 168 may be U-shaped from adjacent end 248 to adjacent end 250 as viewed from the rear (FIG. 9). Rib 168 may have a rearward facing back or rear surface 252, a forward facing front surface 254, an upward facing top edge 256 and a downward facing bottom edge 258 each of which extends from adjacent end 248 to adjacent end 250. Rib 168 and surfaces 252 and 254 may be essentially flat and vertical (as shown in section from the side in FIG. 4) and may lie entirely along respective vertical axially extending planes which may be adjacent and parallel to one another, parallel to plane P and perpendicular to plane CL. Top edge 256 may have a lowermost point or base 260 which may be axially midway between right and left ends 248 and 250 and/or at the intersection of top edge 256 and plane CL. Bottom edge 258 may have a lowermost point or base 262 which may be axially midway between ends 248 and 250 and/or at the intersection of bottom edge 258 and plane CL. As viewed from the rear (FIG. 9) or front, top edge 256 may have a U-shaped configuration and/or be continuously concavely curved from adjacent end 248 to adjacent end 250, bottom edge 258 may have a U-shaped configuration and/or be continuously convexly curved from adjacent end 248 to adjacent end 250, and back surface 252 may have a U-shaped configuration from adjacent end 248 to adjacent end 250. Top edge 256 may curve continuously upward to the left from base 260 to a leftmost point of top edge 256 and upward to the right from the leftmost point of top edge 256 to adjacent left end 250. Top edge 256 may curve continuously upward to the right from base 260 to a rightmost point of top edge 256 and upward to the left from the rightmost point of top edge 256 to adjacent right end 248. Bottom edge 258 may curve continuously upward to the left from base 262 to a leftmost point of bottom edge 258 and upward to the right from the leftmost point of bottom edge 258 to adjacent left end 250. Bottom edge 258 may curve continuously upward to the right from base 262 to a rightmost point of bottom edge 258 and upward to the left from the rightmost point of bottom edge 258 to adjacent right end 248. Rear and front surfaces 252 and 254 may curve continuously upward to the left from adjacent bases 260 and 262 to adjacent the leftmost points of edges 256 and 258 and upward to the right from the leftmost points of edges 256 and 258 to adjacent left end 250. Front and rear surfaces 252 and 254 may curve continuously upward to the right from adjacent bases 260 and 262 to adjacent the rightmost points of edges 256 and 258 and upward to the left from the rightmost points of edges 256 and 258 to adjacent right end 248.

Right and left ends 248 and 250 of rib 168 may be closely adjacent or in contact with plate 162 outer surface 174 and may be respectively adjacent right and left edge segments 180 and 182 of plate 162 so that rib 168 may extend from adjacent edge segment 180 to adjacent edge segment 182. Rib 168 may extend downwardly from ends 248 and 250 away outer surface 174 so that the bottom of rib 168 and bases 260 and 262 are lower than and distal outer surface 174 and bases 242 and 244 of flange 166. Rib 168 adjacent ends 248 and 250 may be rigidly secured to slide plate 162 by respective welds 265 (FIG. 9) between plate 162 outer surface 174 and rib 168 ends 248 and 250. Rib 168 may be rigidly secured to flange 166 by a first or left weld 264 (FIG. 9) between left end 250 and left end 232 and by a second or right weld 264 between right end 248 and right end 230.

Rib 168 in its entirety may be spaced forward of and lower than end plate 164 in its entirety. Thus, ends 248 and 250, edges 256 and 258, and surfaces 252 and 254 may be forward of and lower than surfaces 212 and 214, edges 216 and 218, and tips 220 and 222. Left end 250 may be axially outward of, outboard of or spaced to the left of left end/tip/intersection 222, and right end 248 may be axially outward of, outboard of or spaced to the right of right end/tip/intersection 220. Rib 168 in its entirety may be spaced rearward of front lower end/edge 178 of plate 162. Ends 248 and 250 may be higher than (and bases 260 and 262 may be lower than) edge 178 including segments 152, 154 and 156, ends/intersections 186A and 186B and space 188/cutout 190. Left end 250 may be axially inward of, inboard of or spaced to the right of left end/intersection 186B and leftmost point 208, and right end 248 may be axially inward of, inboard of or spaced to the left of right end/intersection 186A and rightmost point 206.

With primary reference to FIGS. 1, 3 and 4, slide plate 162 of assembly 28B may extend or angle upward and rearward from adjacent plate 162 lower front edge 178 and upper back edge 144 of hopper 26C sidewall 124 to adjacent plate 162 back upper edge/end 176, end plate 164 and the top of end housing 22B sidewall 76, portion 84A of sidewall 76 inner surface 84 and peak 106. Slide plate assembly 28B may be entirely rearward of back end/edge 58 of top wall 54 and exit opening 130 of rear hopper 26C. A rear portion of plate 162 including back edge 176 may be inside end housing 22B sidewall 76 narrower section 88 and a front portion of plate 162 including front edge 178 may be inside end housing 22B wider section 90. End plate 164 may be entirely within narrower section 88. Flange 166 and rib 168 may be adjacent ends/edges 92 and 94 and weld 104 and may be spaced entirely rearward of back edge 144 of hopper 26C sidewall 124.

With primary reference to FIG. 13, this paragraph describes some of the relationships between assembly 28B, rear hopper 26C and rear end housing 22B. Bottom front edge segment 178 of assembly 28B plate 162 may be closely adjacent or in contact with top back edge segment 144 of front hopper 26C along the entire length of each of segments 178 and 144, with right portions 152 and 192 closely adjacent or in contact with one another, with left portions 154 and 194 closely adjacent or in contact with one another and with central portions 156 and 196 closely adjacent or in contact with one another. Intersection/ends 186A may be closely adjacent or in contact with rear right intersection/ends 148, and intersection/ends 186B may be closely adjacent or in contact with rear left intersection/ends 148. The rear portion of hopper 26C sidewall 124 may be received in space 188 and tongue 150 may be received in cutout 190. Right edge 180 of plate 162 may in its entirety be closely adjacent or in contact with inner surface 84 of sidewall 76 primarily along right portion 84C and into top portion 84A from adjacent intersection/ends 186A and right intersection/ends 148 to adjacent intersection/ends 184A and intersection/ends/tip 220. Left edge 182 of plate 162 may in its entirety be closely adjacent or in contact with inner surface 84 of sidewall 76 primarily along left portion 84D and into top portion 84A from adjacent intersection/ends 186B and left intersection/ends 148 to adjacent intersection/ends 184B and intersection/ends/tip 222. Top edge 216 of end plate 164 may in its entirety be closely adjacent or in contact with inner surface 84 of sidewall 76 along top portion 84A from adjacent intersection/ends 184A and intersection/ends/tip 220 to adjacent intersection/ends 184B and intersection/ends/tip 222. Peak or uppermost point 224 of edge 216 may be adjacent peak 106 of end housing sidewall 76.

With primary reference to FIG. 6, this paragraph describes some of the relationships between assembly 28B and end housing 22B. Right end 230 of flange 166 may be adjacent inner surface 84 of sidewall 76 along right portion 84C, and left end 232 of flange 166 may be adjacent inner surface 84 along left portion 84D. Ends 230 and 232 may be in the upper half of end housing 22B. Bases 242 and 244 may be about midway between right and left sides 110 and 112 of sidewall 76 and may be spaced downwardly from peak 106 and upwardly from base 108. Right end 248 of rib 168 may be adjacent inner surface 84 of sidewall 76 along right portion 84C, and left end 250 of rib 168 may be adjacent inner surface 84 along left portion 84D. Ends 248 and 250 may be in the upper half of end housing 22B. Rib 168 bottom edge 258 may be in its entirety closely adjacent or in contact with end housing inner surface 84 along right portion 84C, bottom portion 84B and left portion 84D from adjacent end 248 to adjacent end 250. Rib 168 top edge 256 base 260 and bottom edge 258 base 262 may be about midway between right and left sides 110 and 112 of sidewall 76. Bases 260 and 262 may be adjacent and upward of/directly above sidewall 76 base 108. Base 262 may be closely adjacent or in contact with sidewall 76 inner surface 84 along bottom portion 84B adjacent base 108.

Slide plate assembly 28B may be rigidly secured to end housing 22B sidewall 76 and hopper 26C by various welds which may include welds 266, 268, 270, 272 and 274. Weld 266 (FIG. 13) between assembly 28B plate 162 and hopper 26C sidewall 124 may extend continuously along the entire length of each of bottom front edge segment 178 and top back edge segment 144 from adjacent intersection/ends 186A and right intersection/ends 148 to adjacent intersection/ends 186B and left intersection/ends 148. Weld 266 may be intersected by plane CL and thus may extend from the left portion or half of slide plate 162 and hopper sidewall 124 on the left side of plane CL to the right portion or half of slide plate 162 and hopper sidewall 124 on the right side of plane CL.

Right weld 268 (FIGS. 3, 13) between right edge segment 180 and inner surface 84 of housing 22B sidewall 76 may extend continuously along the entirety of segment 180 primarily along right portion 84C and along right region of top portion 84A. Weld 268 may extend from adjacent intersection/ends 184A and intersection/ends/tip 220 to adjacent intersection/ends 186A and right intersection/ends 148. Weld 268 may be entirely to the right of or on the right side of plane CL and thus not intersected by plane CL. As viewed from the (left or right) side (FIG. 3), weld 268 may extend or curve continuously forward and downward from adjacent intersection/ends 184A to adjacent intersection/ends 186A. As viewed from the front (FIG. 13), weld 268 may be continuously curved from adjacent intersection/ends 184A to adjacent intersection/ends 186A so as to have a C-shaped configuration from adjacent end 184A to adjacent end 186A;

and weld 268 may curve downward to the right from adjacent intersection/ends 184A to adjacent rightmost point 206 and may curve downward to the left from rightmost point 206 to intersection/ends 186A. As viewed from above (FIGS. 1, 19), weld 268 may be continuously curved from adjacent intersection/ends 184A to adjacent intersection/ends 186A. Right side section surface 201 of outer surface 174 may be adjacent right weld 268.

Left weld 270 (FIGS. 4, 13) left edge segment 182 and inner surface 84 of housing 22B sidewall 76 may extend continuously along the entirety of segment 182 primarily along left portion 84D and along the left region of top portion 84A. Weld 270 may extend from adjacent intersection/ends 184B and intersection/ends/tip 222 to adjacent intersection/ends 186B and left intersection/ends 148. Weld 270 may be entirely to the left of or on the left side of plane CL and thus not intersected by plane CL. As viewed from the (left or right) side (FIG. 4), weld 270 may extend or curve continuously rearward and downward from adjacent intersection/ends 184B to adjacent intersection/ends 186B. As viewed from the front (FIG. 13), weld 270 may be continuously curved from adjacent intersection/ends 184B to adjacent intersection/ends 186B so as to have a reverse C-shaped configuration from adjacent end 184B to adjacent end 186B; and weld 270 may curve downward to the let from adjacent intersection/ends 184B to adjacent leftmost point 208 and may curve downward to the right from leftmost point 208 to intersection/ends 186B. As viewed from above (FIGS. 1, 19), weld 270 may be continuously curved from adjacent intersection/ends 184B to adjacent intersection/ends 186B. Left side section surface 201 of outer surface 174 may be adjacent left weld 270.

Weld 272 (FIGS. 3, 4, 6, 13) between end plate top edge 216 and inner surface 84 of housing 22B sidewall 76 may extend continuously along the entirety of top edge 216 primarily or entirely along the top region of sidewall 76 and top portion 84A and may extend adjacent peak 106. Weld 272 may extend axially from adjacent intersection/ends 184A and intersection/ends/tip 220 to adjacent intersection/ends 184B and intersection/ends/tip 222. Weld 272 may be intersected by plane CL and thus may extend from the left portion or half of end plate 164 and sidewall 76 on the left side of plane CL and peak 106 to the right portion or half of end plate 164 and sidewall 76 on the right side of plane CL and peak 106. As viewed from the rear (FIG. 13), weld 272 may have an inverted U-shaped configuration from adjacent intersection/ends/tip 220 to adjacent intersection/ends/tip 222, and may curve continuously downward to the right from peak 224 to adjacent intersection/ends/tip 220 and intersection/ends 184A and downward to the left from peak 224 to adjacent intersection/ends 222 and intersection/ends 184B.

With primary reference to FIG. 6, weld 274 between rib 168 and inner surface 84 of housing 22B sidewall 76 may extend continuously along the entirety of bottom edge 258 along the bottom region of sidewall 76, bottom portion 84A and base 108 as well as along right side 110/right portion 84C and left side 112/left portion 84D. As viewed from the front (FIG. 6) or rear, weld 274 may have a U-shaped configuration from adjacent right end 248 to adjacent left end 250, may curve continuously upward to the left from adjacent base 262 and base 108 to adjacent the leftmost point of bottom edge 258 and upward to the right from the leftmost point bottom edge 258 to adjacent left end 250, and may curve continuously upward to the right from base 262 to adjacent the rightmost point of bottom edge 258 and upward to the left from the rightmost point bottom edge 258 to adjacent right end 248.

Assembly 28B slide plate 162 and end plate 164 may be secured to end housing 22B sidewall 76 and hopper 26C sidewall 124 via welds 266, 268, 270 and 272 as described above so as to provide an airtight interior chamber 20 which is separated from end housing chamber 24B by plates 162 and 164 so that chamber 20 may extend forward of plates 162 and 164 and chamber 24B may extend rearward of plates 162 and 164. Chamber 20 may be partially defined by slide plate 162 inner surface 172 and end plate 164 front surface 214. Chamber 24B may be partially defined by slide plate 162 outer surface 174 and end plate 164 back surface 212.

With primary reference to FIGS. 14-19, acute angles defined between assembly 28B slide plate 162 and end housing 22B sidewall 76 adjacent welds 180 and 182 are now discussed. Acute angles A-F may have the same relative values and numerical values as discussed above with respect to assembly 28A. However, angles A-C with respect to assembly 28B are angles as viewed in a different viewing direction than angles A-C with respect to assembly 28A, and other differences may be noted below.

Each of FIGS. 14-16 with respect to assembly 28B is a sectional view looking downward and forward along slide plate 162 in a direction which may be parallel to base 204 or arrow or line V2 (FIG. 1), as discussed further above. This paragraph discusses angles A-C as viewed in this downward and forward viewing direction. Each of angles A, B and C is defined between a tangent of slide plate outer surface 174 and a tangent of sidewall inner surface 84 wherein the pair of tangents (shown in dashed lines) defining the given angle is either adjacent weld 268/side edge segment 180 or adjacent weld 270/side edge segment 182. More particularly, each of angles A, B and C may be defined between a tangent of slide plate outer surface 174 along left section/portion 202 adjacent left side edge segment 182 and adjacent weld 270 and a tangent of sidewall inner surface 84/left portion 84D adjacent left edge segment 182 and adjacent weld 270. End housing inner surface 84 may include a left end housing inner surface angle defining portion 276 which may be adjacent and below left edge segment 182 and weld 270. Each of angles A, B and C may be defined between a tangent of left side section surface 201 and a tangent of left angle defining portion 276. Each of angles A, B and C may also be defined between a tangent of slide plate outer surface 174 along right section/portion 200 adjacent right side edge segment 180 and adjacent weld 268 and a tangent of sidewall inner surface 84/right portion 84C adjacent right edge segment 180 and adjacent weld 268. End housing inner surface 84 may include a right end housing inner surface angle defining portion 276 which may be adjacent and below right edge segment 180 and weld 268. Each of angles A, B and C may be defined between a tangent of right side section surface 201 and a tangent of right angle defining portion 276. At the location of the given pair of tangents defining the given angle A, B or C, surfaces 174 and 84 are adjacent one another and face one another. At the given tangent of outer surface 174 defining a given angle A-C adjacent left edge segment 182 and weld 270, surface 174 may face axially outward to the left, downward and rearward. At the given tangent of inner surface 84 defining a given angle A-C adjacent left edge segment 182 and weld 270, surface 84 may face axially inward to the right, forward and upward (angles B and C) or downward (angle A). At the given tangent of outer surface 174 defining a given angle A-C adjacent right edge segment 180 and weld 268, surface 174 may face axially outward to the right, downward and rearward. At the given tangent of inner surface 84 defining a given angle A-C adjacent right edge segment 180 and weld 268, surface 84 may face axially inward to the left, forward and upward (angles B and C) or downward (angle A).

Angles A, B and C with respect to assembly 28B are thus analogous angles as viewed forward and downward although at different longitudinal and/or vertical/height locations along slide plate 162 and sidewall 76. As can be seen from FIG. 3, the section of FIG. 14 and angle A is taken at a location which is rearward of and higher than the sections of FIGS. 15 and 16 and angle B and C, and the section of FIG. 15 and angle B is taken a location which is rearward of and higher than the section of FIG. 16 and angle C. The section of FIG. 14 and angle A is closer to slide plate 162 rear upper end 176 and end plate 164 than are the sections of FIGS. 15 and 16 and angles B and C, and the section of FIG. 15 and angle B is closer to rear upper end 176 and end plate 164 than is the section of FIG. 16 and angle C. The section of FIG. 14 and angle A is closer to rear upper end/edge 176 and end plate 164 than to front lower end/edge 178, intersections/ends 186A and 186B and hopper 26C sidewall 124 back edge segment 144. Each of the sections of FIGS. 15 and 16 and angles B and C is closer to front lower end/edge 178, intersections/ends 186A and 186B and hopper 26C sidewall 124 back edge segment 144 than to back upper end 176 and end plate 164. The sections of FIGS. 14 and 15 and angles A and B are entirely rearward of and higher than front end/edge 178 and back edge 144, whereas the section of FIG. 16 cuts through edge segments 178 and 144 adjacent and rearward of intersections/ends 186A and 186B.

Each of FIGS. 17-19 is a sectional view through assembly 28B slide plate 162 and end housing 22B sidewall 76 looking vertically downward taken along a respective horizontal plane, as shown in FIG. 3. Angles D-F are described as viewed in this vertical downward direction. Each of angles D, E and F is defined between a tangent of slide plate outer surface 174 and a tangent of sidewall inner surface 84 wherein the pair of tangents defining the given angle is either adjacent weld 268/edge segment 180 or adjacent weld 270/edge segment 182. The two tangents defining angle F are shown as dashed lines in FIG. 19, whereas only one of the tangents defining each of angles D and E is shown in dashed lines in FIGS. 18 and 19. The other tangent defining each of angles D and E is simply shown as the solid line which represents sidewall 76 inner surface 84 because this solid line is straight or nearly straight at the given location. More particularly, each of angles D, E and F may be defined between a tangent of slide plate outer surface 174 along left section/portion 202 adjacent left side edge segment 182 and adjacent weld 270 and a tangent of sidewall inner surface 84/left portion 84D adjacent left edge segment 182 and adjacent weld 270. Each of angles D, E and F may be defined between a tangent of left side section surface 201 and a tangent of left angle defining portion 276. Each of angles D, E and F may also be defined between a tangent of slide plate outer surface 174 along right section/portion 200 adjacent right edge segment 180 and adjacent weld 268 and a tangent of sidewall inner surface 84/right portion 84C adjacent right side edge segment 180 and adjacent weld 268. Each of angles D, E and F may be defined between a tangent of right side section surface 201 and a tangent of right angle defining portion 276. At the location of the given pair of tangents defining the given angle D, E or F, surfaces 174 and 84 are adjacent one another and face one another.

At the given tangent of outer surface 174 defining a given angle D-F adjacent left edge segment 182 and weld 270, surface 174 may face axially outward to the left, downward and rearward. At the given tangent of inner surface 84 defining a given angle D-F adjacent left edge segment 182 and weld 270, surface 84 may face axially inward to the right, forward and upward (angle D) or downward (angles E and F). At the given tangent of outer surface 174 defining a given angle D-F adjacent right edge segment 180 and weld 268, surface 174 may face axially outward to the right, downward and rearward. At the given tangent of inner surface 84 defining a given angle D-F adjacent right edge segment 180 and weld 268, surface 84 may face axially inward to the left, forward and upward (angle D) or downward (angles E and F).

Angles D, E and F with respect to assembly 28B are thus analogous angles as viewed vertically downward or along a vertically downward viewing direction although at different longitudinal and/or vertical/height locations along slide plate 162 and sidewall 76. As can be seen from FIG. 3, the section of FIG. 17 and horizontal plane along which it is taken is lower than each of the sections of FIGS. 18 and 19 and the horizontal planes along which they are taken. The section of FIG. 18 and horizontal plane along which it is taken is lower than the section of FIG. 19 and the horizontal plane along which it is taken. The section of FIG. 17, the horizontal plane along which it is taken and angle D may be in the lower half of end housing 22B/sidewall 76. The sections of FIGS. 18 and 19, the horizontal planes along which they are taken and angles E and F may be in the upper half of end housing 22B/sidewall 76. The section of FIG. 17 and angle D is forward of and lower than each of the sections of FIGS. 18 and 19 and angles E and F. The section of FIG. 18 and angle E is forward of and lower than the section of FIG. 19 and angle F.

The section of FIG. 19 and angle F is closer to slide plate 162 back upper end 176 and end plate 164 (the section cuts through end plate 164) than are the sections of FIGS. 17 and 18 and angles D and E, and the section of FIG. 18 and angle E is closer to back upper end 176 and end plate 164 than is the section of FIG. 17 and angle D. The section of FIG. 19 and angle F is closer to back upper end/edge 176 and end plate 164 than to front lower end/edge 178, intersections/ends 186A and 186B and hopper 26C sidewall 124 rear edge segment 144. Each of angles D and E is closer to front lower end/edge 178, intersections/ends 186A and 186B and hopper 26C sidewall 124 back edge segment 144 than to rear upper end 176 and end plate 164. Each of the sections of FIGS. 17, 18 and 19 and angles D, E and F is entirely higher than front end/edge 178 and back edge 144, and the section of FIG. 17 and angle D are adjacent and higher than edge segments 178 and 144 and intersections/ends 186A and 186B.

It is noted that various components or terms having the same names described herein may be denoted as additional or other components, or first, second, third and fourth components, etc. For instance, various hoppers may be denoted as an additional hopper or other hopper or first, second, third, fourth (etc) hoppers, and so forth. Other such components or terms may include, without limitation, housings, slide plate assemblies, slide plates, end plates, flanges, ribs, portions, sections, wheels, walls, sidewalls, openings, intersections, ends, edges, edge segments, surfaces, tips, peaks, bases, welds, angles and so forth.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration is an example and is not limited to the exact details shown or described.

The invention claimed is:

1. A tank trailer comprising:
a hopper having a hopper sidewall defining a bottom exit opening;
an end housing which extends forward or rearward of the hopper sidewall and has an end housing inner surface;
a slide plate which extends upwardly from adjacent the hopper sidewall inside the end housing and has a slide plate outer surface and an outer perimeter edge comprising a left side edge segment and a right side edge segment;
a first weld along one of the side edge segments which secures the slide plate to the end housing inner surface;
a first side section of the slide plate which is adjacent the one of the side edge segments;
wherein the slide plate outer surface along the first side section comprises a first side section surface adjacent the first weld;
the end housing inner surface comprises a first end housing inner surface angle defining portion adjacent the first weld;
the first side section surface is adjacent and faces the first end housing inner surface angle defining portion; and
as viewed in a viewing direction which is one of (a) a downward and rearward direction and (b) a downward and forward direction, the first side section surface and the first end housing inner surface angle defining portion have respective tangents which define therebetween a first angle which is no greater than 45 degrees.

2. The tank trailer of claim 1 wherein the slide plate is U-shaped as viewed in the viewing direction.

3. The tank trailer of claim 2 wherein the end housing inner surface comprises a top portion having an inverted U-shaped configuration as viewed from the front or rear.

4. The tank trailer of claim 1 wherein the first angle is no greater than 25 degrees.

5. The tank trailer of claim 1 wherein the end housing comprises an end housing sidewall having a frustoconical configuration.

6. The tank trailer of claim 1 wherein the first weld extends from adjacent a front end of the one of the side edge segments to adjacent a rear end of the one of the side edge segments; and the end housing inner surface as viewed from the front or rear is concavely curved from adjacent the front end of the one of the side edge segments to adjacent the rear end of the one of the side edge segments.

7. The tank trailer of claim 1 wherein the outer perimeter edge comprises front and back edge segments;
the slide plate is secured to the hopper sidewall by a second weld along one of the front and back edge segments;
an end plate is secured to the slide plate by a third weld along the other of the front and back edge segments; and
the end plate is secured to the end housing by a third weld along a top portion of the end housing inner surface.

8. The tank trailer of claim 1 further comprising
a second weld along the other of the side edge segments which secures the slide plate to the end housing inner surface;
a second side section of the slide plate which is adjacent the other of the side edge segments;
wherein the slide plate outer surface along the second side section comprises a second side section surface adjacent the second weld;
the end housing inner surface comprises a second end housing inner surface angle defining portion adjacent the second weld;
the second side section surface is adjacent and faces the second end housing inner surface angle defining portion; and
as viewed in the viewing direction, the second side section surface and the second end housing inner surface angle defining portion have respective tangents which define therebetween a second angle which is no greater than 45 degrees.

9. The tank trailer of claim 1 wherein as viewed from the front or rear, the first weld has a C-shaped configuration or a reverse C-shaped configuration.

10. The tank trailer of claim 9 further comprising
an end plate which is secured to the slide plate and has a top edge;
a second weld along the top edge of the end plate between the end plate and a top portion of the end housing inner surface;
wherein as viewed from the front or rear, the second weld has an inverted U-shaped configuration.

11. The tank trailer of claim 1 further comprising a second weld between the hopper sidewall and the slide plate.

12. The tank trailer of claim 11 further comprising
an end plate;
a third weld between the end plate and the slide plate; and
a fourth weld between the end plate and the end housing inner surface.

13. The tank trailer of claim 12 wherein as viewed from the front or rear, the third weld has a U-shaped configuration and the fourth weld has an inverted U-shaped configuration.

14. The tank trailer of claim 12 wherein each of the second and third welds extends along the outer perimeter edge.

15. The tank trailer of claim 1 further comprising
an end plate adjacent a front or rear end of the slide plate;
a second weld between the end plate and the slide plate; and
a third weld between the end plate and a top portion of the end housing inner surface.

16. The tank trailer of claim 1 wherein the hopper sidewall has a hopper sidewall inner surface; the slide plate has a slide plate inner surface; and the hopper sidewall inner surface, slide plate inner surface and end housing inner surface together partially define an interior storage chamber.

17. The tank trailer of claim 1 further comprising a support flange inside the end housing; wherein the slide plate outer surface is seated on the support flange.

18. The tank trailer of claim 17 wherein the end housing inner surface has left and right side portions; and the support flange extends from adjacent the left side portion to adjacent the right side portion.

19. The tank trailer of claim 18 further comprising an arcuate rib which extends downward from adjacent the support flange inside the end housing.

20. A tank trailer comprising:
a hopper having a hopper sidewall defining a bottom exit opening;
an end housing which extends forward or rearward of the hopper sidewall and has an end housing inner surface;
a slide plate which extends upwardly from adjacent the hopper sidewall inside the end housing and has a slide plate outer surface and an outer perimeter edge comprising a left side edge segment and a right side edge segment;

a first weld along one of the side edge segments which secures the slide plate to the end housing inner surface;

a first side section of the slide plate which is adjacent the one of the side edge segments;

wherein the slide plate outer surface along the first side section comprises a first side section surface adjacent the first weld;

the end housing inner surface comprises a first end housing inner surface angle defining portion adjacent the first weld;

the first side section surface is adjacent and faces the first end housing inner surface angle defining portion; and as viewed in a vertically downward viewing direction of a horizontal section of the end housing and slide plate, the first side section surface and the first end housing inner surface angle defining portion have respective tangents which define therebetween an angle which is no greater than 45 degrees.

\* \* \* \* \*